United States Patent
Reimer

(10) Patent No.: US 11,916,882 B2
(45) Date of Patent: *Feb. 27, 2024

(54) METHODS AND APPARATUS FOR CONTROLLING AND IMPLEMENTING FIREWALLS

(71) Applicant: Charter Communications Operating, LLC, St. Louis, MO (US)

(72) Inventor: Mark Reimer, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,318

(22) Filed: Sep. 26, 2022

(65) Prior Publication Data
US 2023/0012719 A1 Jan. 19, 2023

Related U.S. Application Data

(63) Continuation of application No. 16/357,199, filed on Mar. 18, 2019, now Pat. No. 11,456,994.

(51) Int. Cl.
*H04L 9/40* (2022.01)
(52) U.S. Cl.
CPC .............................. *H04L 63/0263* (2013.01)
(58) Field of Classification Search
CPC ............. H04L 63/0263; H04L 12/2898; H04L 41/0894; H04L 43/0876; H04L 43/08761
See application file for complete search history.

(56) References Cited

U.S. PATENT DOCUMENTS

| | | | |
|---|---|---|---|
| 9,912,639 B1* | 3/2018 | Wighe | H04L 63/0263 |
| 2005/0076121 A1* | 4/2005 | Kortum | H04L 63/20 709/225 |
| 2005/0240758 A1* | 10/2005 | Lord | H04L 63/0263 713/153 |
| 2011/0125910 A1* | 5/2011 | Sueda | H04L 12/14 709/227 |
| 2014/0068030 A1* | 3/2014 | Chambers | H04L 63/0876 709/220 |
| 2016/0112374 A1* | 4/2016 | Branca | H04L 63/102 726/1 |
| 2018/0176102 A1* | 6/2018 | Bansal | H04L 43/026 |
| 2021/0194860 A1* | 6/2021 | Lee | H04L 9/3242 |

* cited by examiner

*Primary Examiner* — Abu S Sholeman
(74) *Attorney, Agent, or Firm* — Straub & Straub; Michael P. Straub; Stephen T. Straub

(57) ABSTRACT

Network traffic through a router, e.g., home router, operating as a firewall is monitored and analyzed the network to identify devices and the type of one or more of the identified devices. In some embodiments, the device type identification is performed using a neural network. The router stores a set of firewall templates. At different times, different templates are applied, e.g. based on mode of operation, user selection, and/or time information. Rules in a firewall template, applicable at a given time to traffic corresponding to identified devices, that are attempting to send or receive via the router, are applied. Different rules may, and sometimes do, apply to different device type classifications.

20 Claims, 10 Drawing Sheets

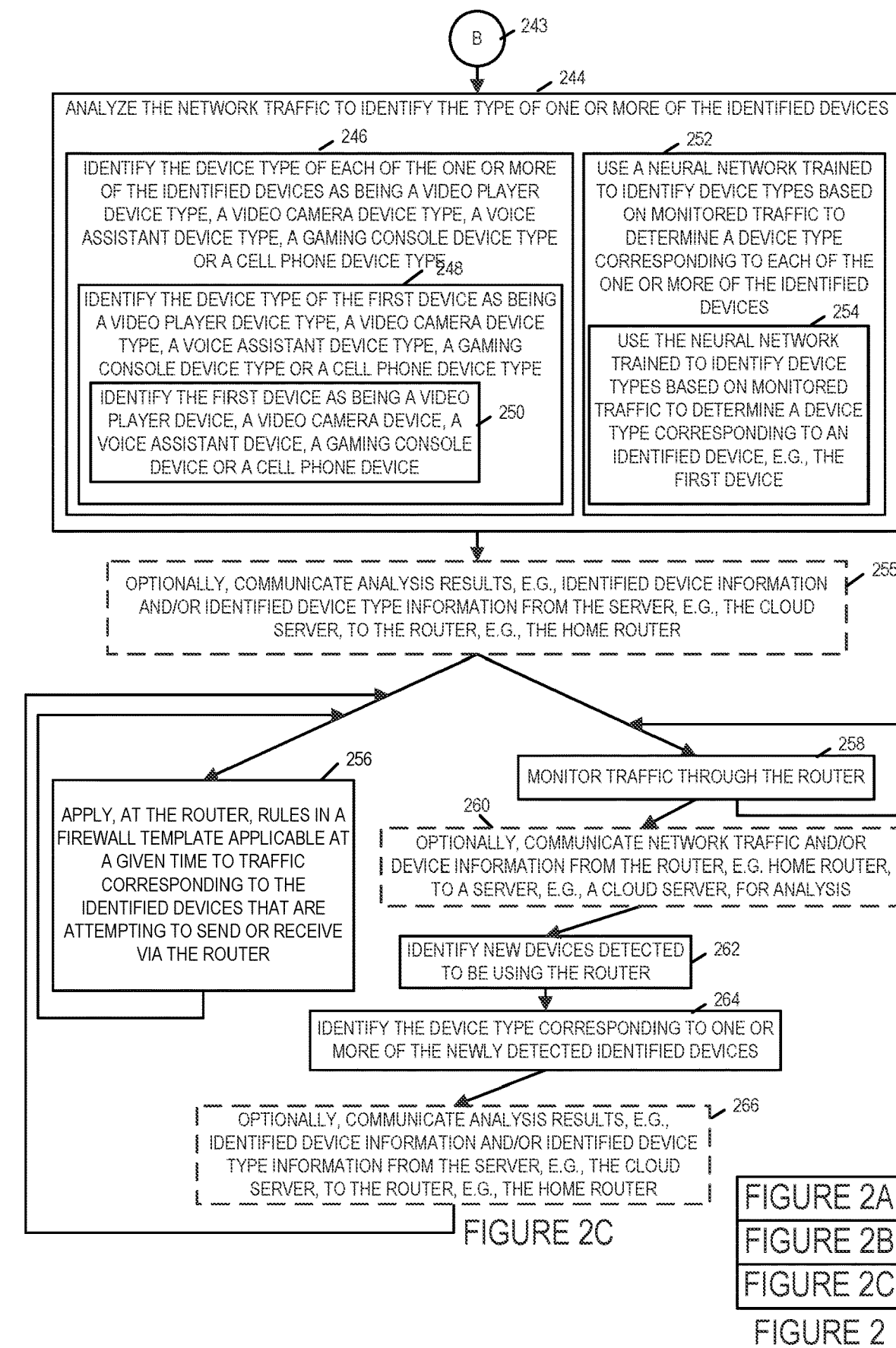

| FIGURE 5A | FIGURE 5B | FIGURE 5C |

METHODS AND APPARATUS FOR CONTROLLING AND IMPLEMENTING FIREWALLS

RELATED APPLICATIONS

The present application is a continuation of U.S. patent application Ser. No. 16/357,199 filed on Mar. 18, 2019, which published as U.S. patent publication US 2020-0304469 A1 on Sep. 24, 2020, and which is hereby expressly incorporated by reference in its entirety.

FIELD

The present application relates to methods and apparatus for controlling access to one or more networks, e.g., the Internet, and more particularly, to methods and apparatus for implementing and/or controlling a firewall in a network device, e.g., home router.

BACKGROUND

Individuals, including family members can find it difficult to resist accessing Internet content. Such access while in a home is often done by using a router in the home to connect to an external network such as the Internet.

Internet content designers are engineering technology to get us hooked. They are combining scientific research of human behavior and addiction, with thousands of real-time experiments to craft the ideal design so that their content receives the most time. The effect of this technology is a new form of addiction to digital content in the form of social media, streaming media, and gaming. Individuals have anxiety and/or a fear of missing out and continue to fall into the digital traps that steal their time.

Individuals can try to use our devices more responsibly, but it's the individual's willpower against hundreds of engineers who are paid to keep us glued to the screen.

Parents concerned over children's use of the Internet sometimes install parental monitoring applications on the children's devices. Such applications run on individual devices and use of another device by the child may avoid the effectiveness of a parental monitoring program installed on another device. For example while a parental monitoring application installed on a child's laptop or desktop computer might block or limit the child's Internet access from the laptop or desktop computer the child might still be able to access the Internet using their cell phone.

Businesses sometimes install firewall devices which can be configured to block access to particular Internet sites or other wasteful activates involving connection to networks outside the business. Unfortunately, business level firewall devices can often be difficult to configure with the businesses information technology (IT) specialist often spending a fair amount of time configuring particular ports and/or IP addresses to be blocked.

The complexity of configuring a business level firewall is often beyond the ability of an average homeowner or parent to configure making such devices poorly suited for use in home applications.

In view of the above it should be appreciated that there is a need for methods and/or apparatus for controlling access to the Internet and/or other networks from a customer premises, e.g., home, without requiring a user of the device, such as a parent, to specifically configure ports and/or IP address information in a firewall or other network policing device. While not necessary for all embodiments it would be desirable, if in at least some embodiments, devices on a network could be automatically identified and rules with regard to Internet or external network access controlled based on device type with different types of devices being subject to different rules.

It would also be desirable if at least in some embodiments a user could configure rules based on device type and have them apply at different times of day or different days of a week without having to individually entry IP addresses and/or port numbers as part of configuring a system designed to enforce the users Internet and/or network access constraints.

SUMMARY

In various embodiments an easy to configure and/or control firewall device located at a customer premises, e.g., home, is used to control access to one or more networks external to the customer premises, e.g., the Interment. The firewall device in some embodiments is integrated into a home router through which devices at the home where the router is located communicated to external devices, e.g., Internet services that may, and sometimes do, supply video and/or other content to the devices at the home.

In some embodiments a network device at a customer premises, e.g., a home, is used to enable Internet and/or connectivity between devices on a home network and one or more networks outside the customer premises such as the Internet.

The network device, e.g., router, includes a home network monitoring device. The home network monitoring device monitors traffic passing through the router to/from devices on the home network. The router can and also sometimes does monitor local traffic on the home network, e.g., between devices on the home network.

Devices on the home network are identified based on the addresses they use and/or other information such as device identifiers they may communicate to other devices or to advertise device capability information. For example in some embodiments a devices sending a message or data is identified by a source address included in the monitored traffic. A device receiving data is sometimes identified by a destination address included in the monitored traffic. The addresses used to identify particular devices may be and sometimes are MAC or IP addresses.

Once traffic corresponding to a device has been identified, it is analyzed to determine the type of device to which the traffic corresponds. In various embodiments pattern recognition information is used to identify different types of traffic with the type of traffic and/or the pattern of traffic being used to determine the type of device to which the traffic corresponds. A neural network, trained to identify device type based on the type of traffic a device sends and/or receives, is used in some embodiments to make device type determinations. The neural network may be located in the server, e.g. home server, or in a server, e.g., a cloud based server. When the device type determinations are made in the server, device information and/or traffic information is communicated to the server for analysis. The device type determinations when made in a server external to the router, e.g. home router, are communicated to the router, e.g. home router, which supplies traffic information to the server. For example a device which receives audio and video content may be determined to be a video playback device, while a device which sends audio and video to an external server may be, and sometimes is, determined to be a audio/video recording device. Types of devices which can be, and sometimes are, automatically detected on the home network include but are not limited to a video player device type, a video camera device type, a voice assistant device type, a gaming console device type, and/or a cell phone device type.

In various embodiments a user is provided an opportunity to specify firewall configuration rules for one or more device types. A set of firewall rules corresponding to different devices form what is referred to as a template. A user can create different templates to use, e.g., at different times of day, on different days of a week or in response to a user that a particular template should be used immediately, e.g., when the user instructs the firewall device to implement a particular previously configured template.

The firewall in the router determines which template is to be used at a given time based on the date, time of day and/or other user input. The individual rules, e.g., specified in the template to be implemented, for each type of device are determined from the stored template and are automatically implemented by the firewall. For example if a template to be used at a given time indicates that all video playback devices are to be blocked, all devices on the home network which were determined to be video playback devices will be blocked from receiving traffic via the firewall. While a template might block video playback devices it might indicate that audio devices are to be enabled in which case traffic corresponding to devices which are determined to be of an audio device type will be allowed to communicate, e.g., receive, traffic and thus audio via the router and the firewall will allow audio packets to be received for audio devices. As should be appreciated devices of a video type normally also support audio but traffic corresponding to such devices including both audio and video would be blocked when the rule indicates that traffic corresponding to video devices should be blocked.

A user can create multiple templates and designate different templates to be used at different times. In some embodiments templates may include information used to whitelist one or more particular devices, such as an IP or MAC address corresponding to a particular device. In such cases including a device on a whitelist in the template indicates that traffic corresponding to the specific device should not be subject to a restriction even if it is a device of a type which would otherwise be subject to a firewall implemented traffic restriction.

By creating multiple templates a user can easily control firewall operation without having to identify specific devices which are subject to traffic restrictions and rely instead on the systems ability to automatically identify devices and the device type based on monitored network traffic.

As a new device enters the system a brief period of traffic monitoring will occur as the device is identified and the corresponding device type is determined automatically. The type of such identification and type detection can be relatively small and the fact that a small amount of traffic may be permitted through the firewall before the firewall rules are applied is of relatively small concern in many cases when compared to the complexity of otherwise configuring a firewall by having to enter device identification information and/or particular restrictions for individual devices to which rules are to be applied.

Notably the methods and apparatus of the present invention allow a firewall in a home or at another customer premises to be easily managed with having to set particular IP and/or port restrictions or enter other complicated information that might be difficult for an average user to understand or set.

An exemplary method, in accordance with various embodiments, comprises: analyzing network traffic on a network to identify devices using a router, e.g., a home router; and analyzing the network traffic to identify the type of one or more of the identified devices; and applying, at the router, rules in a firewall template applicable at a given time to traffic corresponding to identified devices that are attempting to send or receive via the router. In some such embodiments, at least some of the analysis for device type classification is performed by a neural network, e.g., a convolutional neural network. The neural network may be located within the router or within a server, e.g., a cloud server.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional variations and features are discussed in the detailed description which follows.

BRIEF DESCRIPTION OF THE FIGURES

FIG. 2C is a third part of a flowchart of an exemplary method of controlling and implementing a firewall in accordance with an exemplary embodiment.

FIG. 2 comprises the combination of FIG. 2A, FIG. 2B and FIG. 2C.

DETAILED DESCRIPTION

Figure 1:
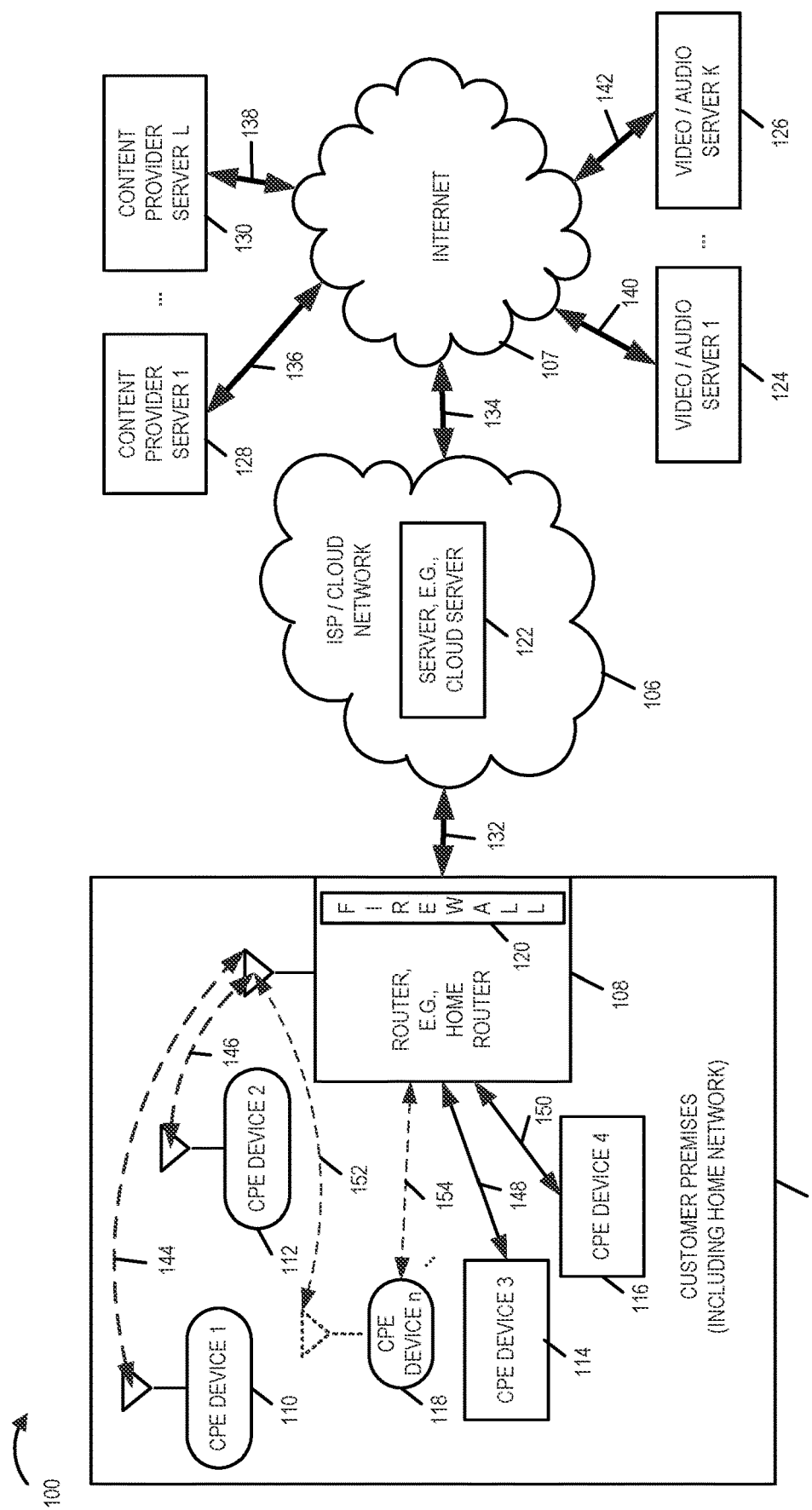
FIG. 1 is a drawing of an exemplary communications system in accordance with an exemplary embodiment.

FIG. 1 is a drawing of an exemplary communications system 100 in accordance with an exemplary embodiment.

Exemplary communications system 100 includes a customer premises 102 including a home network, an Internet Service Provider (ISP)/cloud network 106, Internet 107, a plurality of content provider servers (content provider server 1 128, . . . , content provider server L 130), and a plurality of video/audio servers (video/audio server 1 124, . . . , video/audio server K 126) coupled together as shown in FIG. 1. Customer premises 102 includes a router 108, e.g., a home router, and a plurality of customer premises equipment (CPE) devices (CPE device 1 110, CPE device 2 112, CPE device 3 114, CPE device 4 116, . . . CPE device n 118). Router 108 includes firewall 120. ISP/cloud network 106 includes server 122, e.g, a cloud server.

Router 108 is coupled to ISP/cloud network via communications link 132. The ISP/cloud network 106 is coupled to Internet 107, via communications link 134. The content provider servers (128, . . . , 130) are coupled to Internet 107 via communications links (136, . . . , 138), respectively. The video/audio servers (124, . . . , 126) are coupled to Internet 107 via communications links (140, . . . , 142), respectively.

CPE device 1 110 is coupled to router 144, e.g., a home router, via wireless link 144 over which wireless signals, e.g., home network signals are communicated. CPE device 2 112 is coupled to router 144, e.g., a home router, via wireless link 146 over which wireless signals, e.g., home network signals are communicated. CPE device 3 114 is coupled to router 144, e.g., a home router, via wired link 148 over which wireless signals, e.g., home network signals are communicated. CPE device 4 116 is coupled to router 108, e.g., a home router, via wired link 150 over which signals, e.g., home network signals are communicated. CPE device n 118 is coupled to router 144, e.g., a home router, via wireless link 152 and/or via wired link 154, over which signals, e.g., home network signals are communicated.

In some embodiments, firewall rule templates are created, stored, and/or used. Different firewall templates may, and sometimes do, correspond to different modes and/or different times. In various embodiments traffic through router 108 is monitored and the traffic is analyzed, e.g., to identity devices and classify a device type for an identified device. In some embodiments, at least some of the device type classification is performed by a neural network, e.g., a convolution neural network. The analysis of the traffic may be performed in the router 108, in the server 122, or portions of the analysis may be performed in each of router 108 and server 122. Different identified device types may, and sometimes, do correspond to different firewall rules in a particular firewall template. The router 108 applies rules in the firewall template applicable at a given time to traffic corresponding to the identified devices that are attempting to send or receive via the router 108.

Router 108 includes a firewall 120. Router 108 and/or server 122 are configured to perform an exemplary method(s) to implement and/or control firewall 120, in accordance with an exemplary embodiment.

Figure 2A:
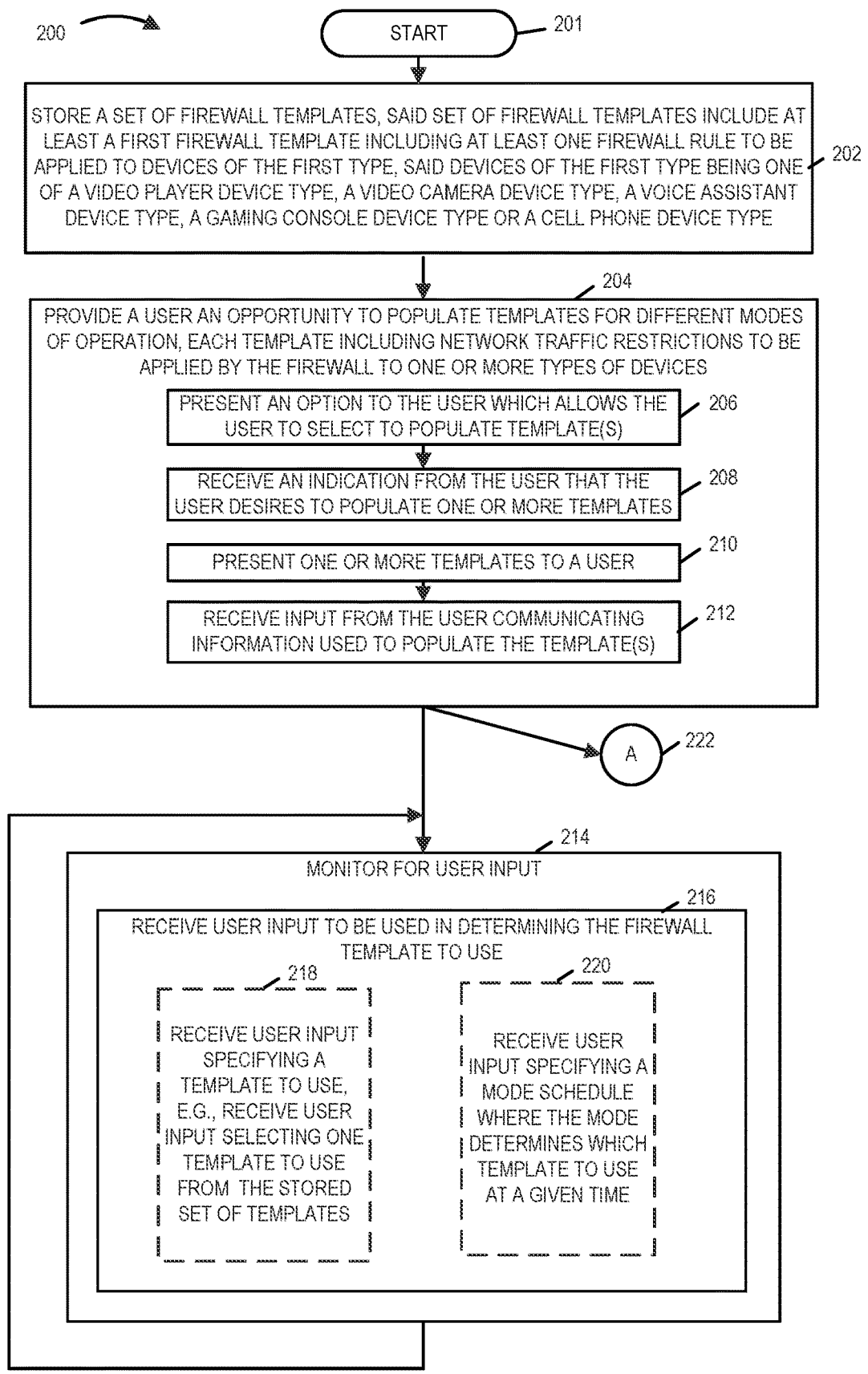
FIG. 2A is a first part of a flowchart of an exemplary method of controlling and implementing a firewall in accordance with an exemplary embodiment.
Figure 2B:
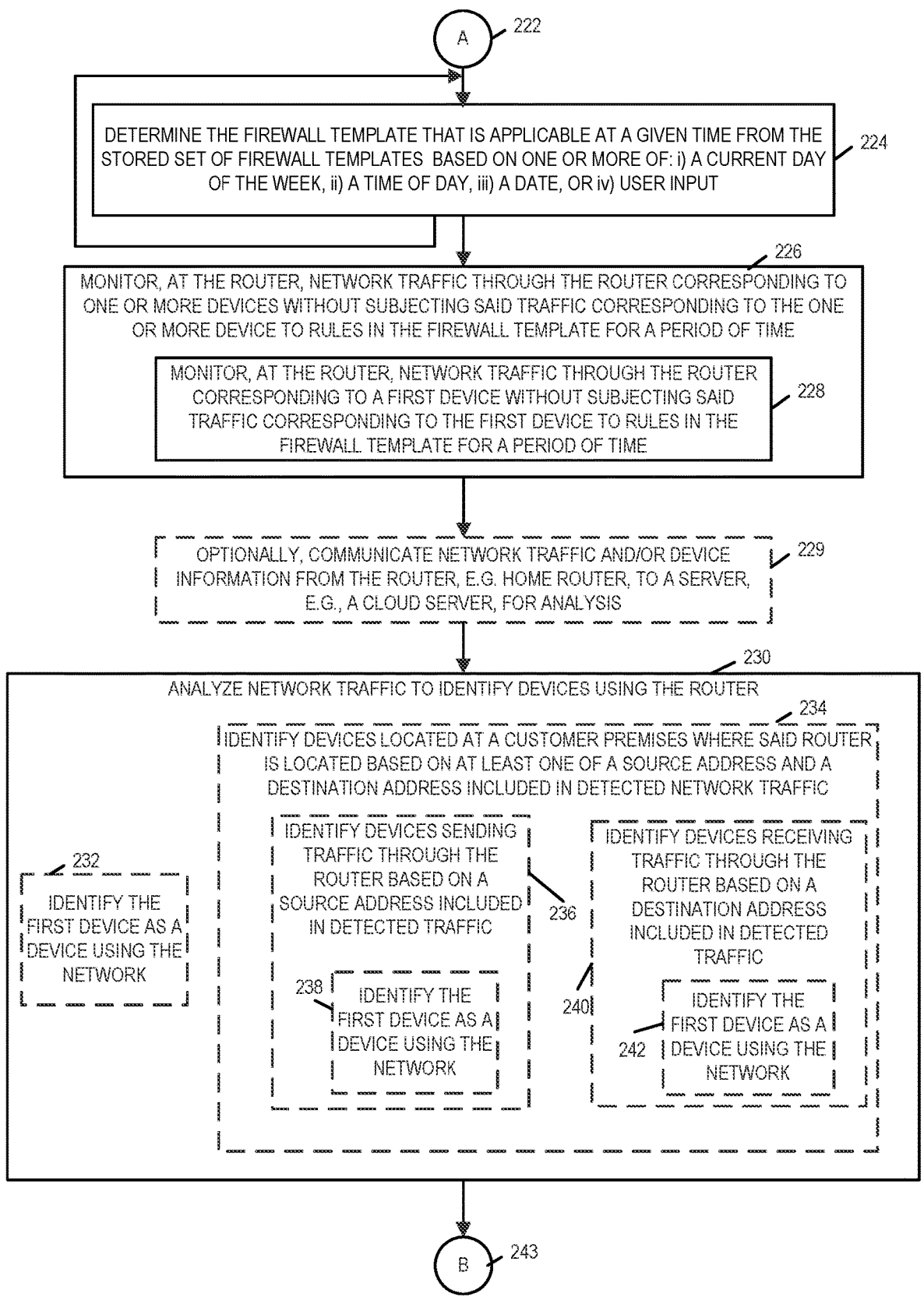
FIG. 2B is a second part of a flowchart of an exemplary method of controlling and implementing a firewall in accordance with an exemplary embodiment.

FIG. 2, comprising the combination of FIG. 2A, FIG. 2B and FIG. 2C, is a flowchart 200 of an exemplary method of controlling and implementing a firewall in accordance with an exemplary embodiment. Operation of the exemplary method starts in step 201 and proceeds to step 202. In step 202 a router, e.g., a home router, such as router 108 of system 100 of FIG. 1, stores a set of firewall templates, said set of firewall templates including at least a first firewall template including at least one rule to be applied to devices of the first type, said devices of the first type being one of a video player device type, a video camera device type, a voice assistant device type, a gaming console device type or a cell phone device type. The set of firewall templates may, and sometimes, does include a plurality of different templates. Operation proceeds from step 202 to step 204.

In step 204, the router provides a user an opportunity to populate templates for different modes of operation, each template including network traffic restrictions to be applied by the firewall to one or more types of devices. Step 204 includes steps 206, 208, 210 and 212. In step 206 the router presents an option to the uses which allows the user to select to populate template(s), e.g., the router sends a CPE device corresponding to the user, a message indicating that the user can select to populate firewall templates, and the user's CPE displays the option to the user on its display. Operation proceeds from step 206 to step 208. In step 208 the router receives an indication from the user that the user desires to populate one or more templates, e.g., the router receives a message from the CPE device of the user indicating that the user desires to populate template(s). Operation proceeds from step 208 to step 210. In step 210, the router presents one or more templates to the user, e.g., the router sends one or more templates to the user's CPE device, which displays the template to the user. Operation proceeds from step 210 to step 212. In step 212 the router receives input from the user communicating information used to the populate the template(s), e.g., the router receives a message from the CPE device of the user communicating the information used to populate the template(s). Operation proceeds from step 204 to step 214, and operation proceeds from step 204, via connecting node A 222 to step 224.

In step 214, the router monitors for user input, e.g., the router monitors for a message from a CPE device of a user. Step 214 is performed on an ongoing basis. Step 214 may and sometimes does include step 216. In step 216 the router receives user input to be used in determining the firewall template to use, e.g., the router receives a message from a CPE device of the user including input to be used in determining the firewall template to use. Step 216 may, and sometimes does include one of steps 218 and 220. In step 218 the router receives user input specifying a template to use, e.g., the router receives user input in a message from the user's CPE device, said user input selecting one of the firewall templates to use from the stored set of firewall templates. In step 220 the router receives user input specifying a mode schedule, where the mode determines which template to use at a given time, e.g., the router receives a message from the CPE device of user identifying a mode schedule from among a plurality of alternative mode schedules, where each mode schedule determines which template to use at a given time. Different iterations of step 216 may include different ones of step 218 and step 220.

In some embodiments, the user which is allowed to provide input which is received by the router in steps 212 and/or step 216 has a special privileged status level among the users which may use the home network corresponding to the router.

Returning to step 224, in step 224, the router determines the firewall template that is applicable at a given time from the stored set of firewall templates based on one or more of: i) a current day of the week, ii) a time of day, iii) a date, or iv) user input, e.g., user can specify template to use or can specify a template or mode schedule where the mode determines which templates to use a given time, e.g., the user input is user input received in step 216. Step 224 is performed on an ongoing basis, e.g., repetitively. Operation proceeds from step 224 to step 226.

In step 226 the router monitors network traffic through the router corresponding to one or more devices without subjecting said traffic corresponding to the one or more devices to rules in the firewall template for a period of time. Step 226 includes step 228 in which the router monitors network traffic through the router corresponding to a first device, e.g., CPE device 1 110 of FIG. 1, without subjecting the said traffic corresponding to the first device to rules in the firewall template for a period of time.

In some embodiments, e.g., an embodiment in which analysis of network traffic is performed in a server, e.g., cloud server 122, external to the router, operation proceeds from step 226 to step 229. In some embodiments, e.g., an embodiment in which the analysis of network traffic is performed within the router, optional step 229 is bypassed and operation proceeds from step 226 to step 230.

In step 229 the router communicates network traffic and/or device information from the router, e.g., home router 108, to a server, e.g. cloud server 122, for analysis. Operation proceeds from step 229 to step 230.

In step 230 network traffic is analyzed to identify devices using the router. In some embodiments, step 230 and steps within step 230 are performed by the router. In other embodiments, step 230 and steps within step 230 are performed by the server. In still other embodiments, step 230 and steps within step 230 can be, and sometimes are, performed by both the router and server, e.g., with some of the devices being identified by the router and some of the devices being identified by the server.

Step 230 may, and sometimes does include one or both of steps 232 and step 234. In step 234 the first device is identified as a device using the network. In step 234 devices located at the customer premises, where the router is located are identified based on at least one of a source address and a destination address included in detected network traffic, e.g., source IP or MAC address for outgoing traffic and destination IP or MAC address for incoming traffic.

Step 230 includes one or both of step 236 and step 240. In step 236 devices sending traffic through the router are identified based on a source address included in detected traffic. Step 236 may, and sometimes does, include step 238 in which the first device is identified as a device using the network. In step 240 devices receiving traffic through the router are identified based on a destination address included in detected traffic. Step 240 may, and sometimes does, include step 242 in which the first device is identified as a device using the network.

Operation proceeds from step 230, via connecting node B 243, to step 244. In step 244 the network traffic is analyzed to identify the type of one or more or all of the identified devices. In some embodiments, step 244 and steps within step 244 are performed by the router. In other embodiments, step 244 and steps within step 244 are performed by the server. In still other embodiments, step 244 and steps within step 244 can be, and sometimes are, performed by both the router and server, e.g., with some device types corresponding to identified devices being identified by the router and some device types corresponding to identified devices being identified by the server.

Step 244 includes one or both of step 246 and step 252. In step 246 the device type of each of the one or more of the identified devices is identified as being a video player device type, a video camera device type, a gaming console device type or a cell phone device type. Step 246 may, and sometimes does, include step 248. In step 248 the device type of the first device is identified as being a video player device type, a video camera device type, a gaming console device type or a cell phone device type. Step 248 may, and sometimes does, include step 250. In step 250 the first device is identified as being a video player device, a video camera device, a gaming console device or a cell phone device.

In step 252, a neural network trained to identify device types based on monitored traffic is used to determine a device type corresponding to each of the one or more of the identified devices. Step 252 includes step 254, in which the neural network trained to identify device types based on monitored traffic is used to determine a device type corresponding an identified device, e.g., the first device. In some embodiments, the neural network is included in the router, e.g., neural network 335 is included in router 108. In some other embodiments, the neural network is included in the server, e.g., neural network 423 is included in server 122.

In some embodiments, e.g., an embodiment in which analysis of network traffic is performed in the server, e.g., cloud server 122, external to the router, operation proceeds from step 244 to step 255. In some embodiments, e.g., an embodiment in which the analysis of network traffic is performed within the router, optional step 255 is bypassed and operation proceeds from step 244 to steps 256 and 258.

Returning to step 255, in step 255 the server communicates analysis results, e.g., identified device information and/or identified device type information from the server, e.g. cloud server, to the router, e.g., home router. Operation proceeds from step 255 to step 256 and 258.

In step 256 the router applies rules in a firewall template applicable at a given time to traffic corresponding to the identified devices, e.g., the one or more or all of the identified devices for which device type was identified, that are attempting to send or receive via the router. Step 256 is performed repetitively, e.g. on an ongoing basis.

In step 258 the router monitors traffic through the router. Step 258 is performed repetitively, e.g. on an ongoing basis. In some embodiments, e.g. embodiments, in which traffic analysis is performed in a server, operation proceeds from step 258 to step 260 in which the router communicates network traffic and/or device information from the router to the server for analysis. In some embodiments, e.g. some embodiments, in which traffic analysis is performed in the router, optional step 260 is bypassed and operation proceeds from step 258 to step 262. In step 262 new devices detected using the router are identified. Operation proceeds from step 262 to step 264. In step 264 the device type corresponding to one or more of the newly detected identified devices is identified, e.g. on a per device basis. Steps 262 and/or steps 264 are performed by the router and/or server depending upon the particular embodiment. Step 262 uses the same approach as previously described with respect to step 250. Step 264 uses the same approach as previously described with respect to step 244.

In some embodiments, e.g., an embodiment in which analysis of network traffic is performed in the server, e.g., cloud server 122, external to the router, operation proceeds from step 264 to step 266. In some embodiments, e.g., an embodiment in which the analysis of network traffic is performed within the router, optional step 266 is bypassed and operation proceeds from step 264 to step 256.

Returning to step 266, in step 266 the server communicates analysis results, e.g., identified device information and/or identified device type information from the server, e.g. cloud server, to the router, e.g., home router. Operation proceeds from step 266 to step 256.

In some embodiments, at least one firewall template includes a whitelist of devices which are not to be subject to restrictions imposed by rules in said at least one firewall template, a device on the whitelist being identified on said whitelist by an IP address, MAC address or device identifier.

In some embodiments, the firewall template applicable at the given time is a first template that corresponds to a concentrating mode of operation in which devices of different types listed in the template are to be blocked from accessing the Internet for a specified period of time, e.g., devices are blocked from the Internet for a particular specified time period during a day or for period of time of having a specific duration, e.g., 30 minutes from the time concentrating mode is activated.

In some embodiments, the firewall template applicable at the given time is a first template that corresponds to a quality time mode in which Internet access is blocked for device types or specific devices identified in the template as devices which are to be permitted Internet access during quality time mode operation.

In some embodiments, the firewall template applicable at the given time is a first template that corresponds to a metering mode of operation in which devices of at least one type are limited to a specified amount of access to one or more networks outside the customer premise, e.g., the Internet, within a predetermined recurring time interval, e.g., a 24 hour period. For example cell phones may be and sometimes are limited to a maximum of 2 hours Internet access per day.

In some embodiments, the firewall template applicable at the given time is a first template that corresponds to a night mode in which video player type devices, gaming console type devices, mobile phone devices, computer type device and streaming music player devices are blocked by the router from communicating through the router.

In some embodiments, the firewall template applicable at the given time is a first template that corresponds to an off the record mode in which one, multiple or all of: audio recording type devices, video recording type devices, or audio and video recording type devices are blocked from communicating through the router.

Figure 3:
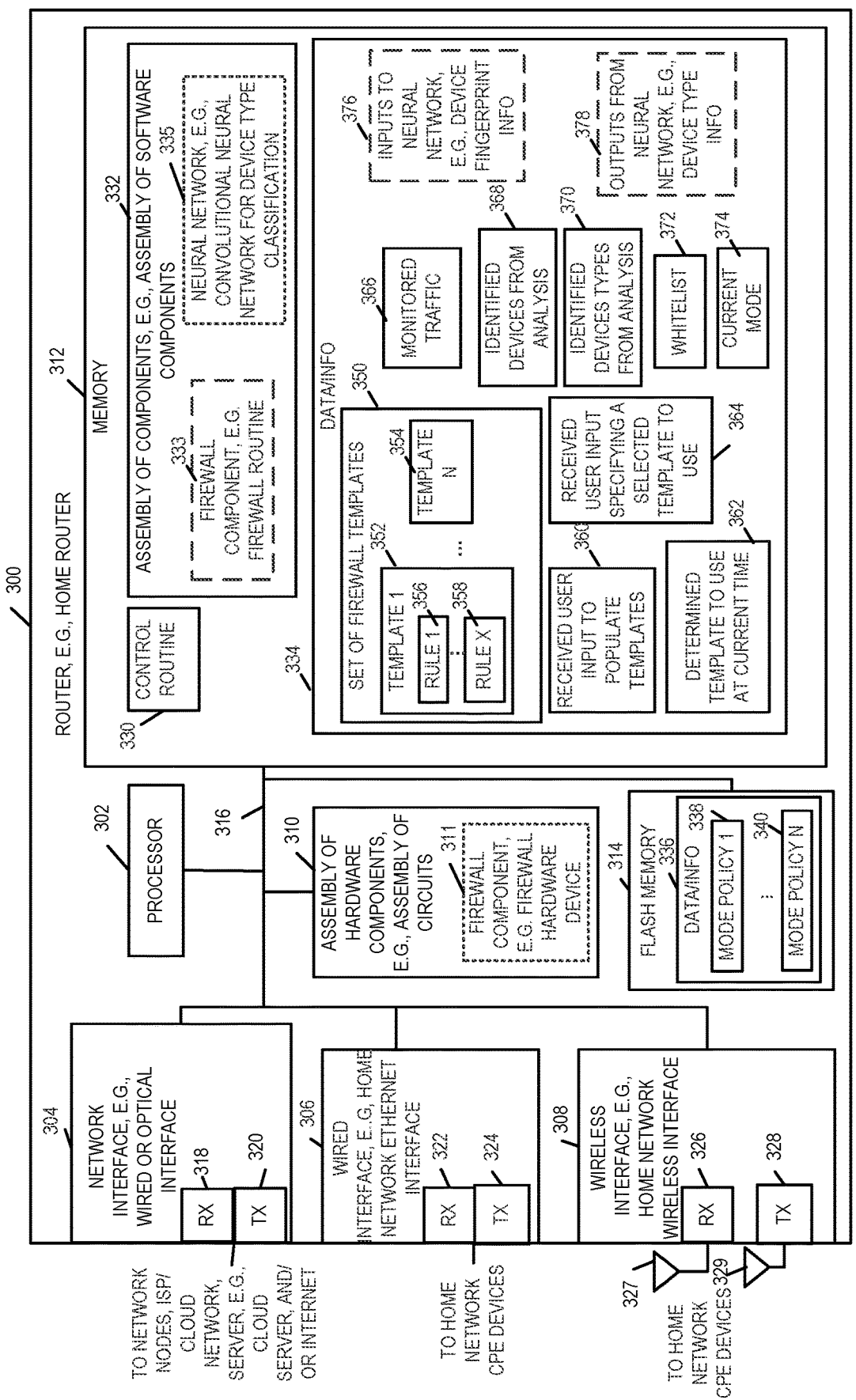
FIG. 3 is a drawing of an exemplary router, e.g., a home router, implemented in accordance with an exemplary embodiment.

FIG. 3 is a drawing of an exemplary router 300, e.g., a home router, implemented in accordance with an exemplary embodiment. Router 300 of FIG. 3 is, e.g., router 108 of FIG. 1. Firewall 120 of router 108 of FIG. 1 is, e.g. one of firewall component 311, firewall component 311, or a firewall implemented in processor 302, e.g., based on firewall component 333 code loaded into processor 302, of router 300 of Router 300 includes a processor 302, e.g., a CPU, a network interface 304, a wired interface 306, e.g., a home network Ethernet interface 306, a wireless interface 308, e.g., a home network wireless interface, e.g., a WiFi interface, an assembly of hardware components 310, e.g., an assembly of circuits, memory 312, and flash memory 314 coupled together via bus 316 over which the various elements may interchange data and information.

Network interface 304 couples router 300 to network nodes, an ISP/cloud network, servers, e.g., a cloud server, and/or the Internet. Network interface 304 includes receiver 318 and transmitter 320. Exemplary received signals received via receiver 318, includes received data traffic signals including video content from a video server or a content provider server. Exemplary transmitted signals transmitted via transmitter 320, includes, e.g., transmitted data traffic signals from a CPE device in CP in which router 300 is located, e.g., traffic signals including gaming data intended to be communicated to a gaming server website.

Wired interface 306 includes receiver 322 and transmitter 324, via which the router 300 may receive and send signals to CPE devices within the home network of router 300. Wireless interface 308 includes receiver 326 coupled to receive antenna 326 and transmitter 328 coupled to transmit antenna 329, via which the router 300 may receive and send signals, respectively, to CPE devices within the home network of router 300.

Memory 312 includes control routine 330, e.g., for controlling basic operational function of the router 300, an assembly of components 332 and data/information 334. Assembly of components 332, in some embodiments, includes one or both of a firewall component 333, e.g., a firewall routine, and a neural network 335, e.g., a convolutional neural network for device type classification. In some embodiments, assembly of hardware components 310 includes firewall component 311, e.g., a firewall hardware device. Flash memory 314 includes data/information 336. Data/information 336 includes a plurality of mode policy sets of information (mode policy 1 information, . . . , mode policy N information 340) corresponding to the firewall implemented within router 300. In some embodiments some or all of the data/information shown as included in flash memory 314 is included in memory 312. In some embodiments some or all of the data/information shown as included in memory 312 is included in flash memory 314.

Data/information 334 includes a set of firewall templates 350 including a plurality of firewall templates (template 1 352, . . . , template N 354), each template including one or more rules. Firewall template 1 352 includes rule 1 356, . . . , rule X 358. Data/information 334 further includes received user information, e.g. from a supervisory level user, including information to populate one or more templates 360, received user input, e.g. from the supervisory level user, specifying a selected template to user 364, a determined template to use at the current time 362, a current mode 374, monitored traffic 366, identified devices from analysis 368, identified device types corresponding to one or more of the identified devices 370, a whitelist 372, e.g., of devices which override rules in a firewall template. In some embodiments, data/information 334 further includes inputs 376 to a neural network, e.g., device fingerprint information, and outputs 378 from the neural network, e.g. device type information.

Figure 4:
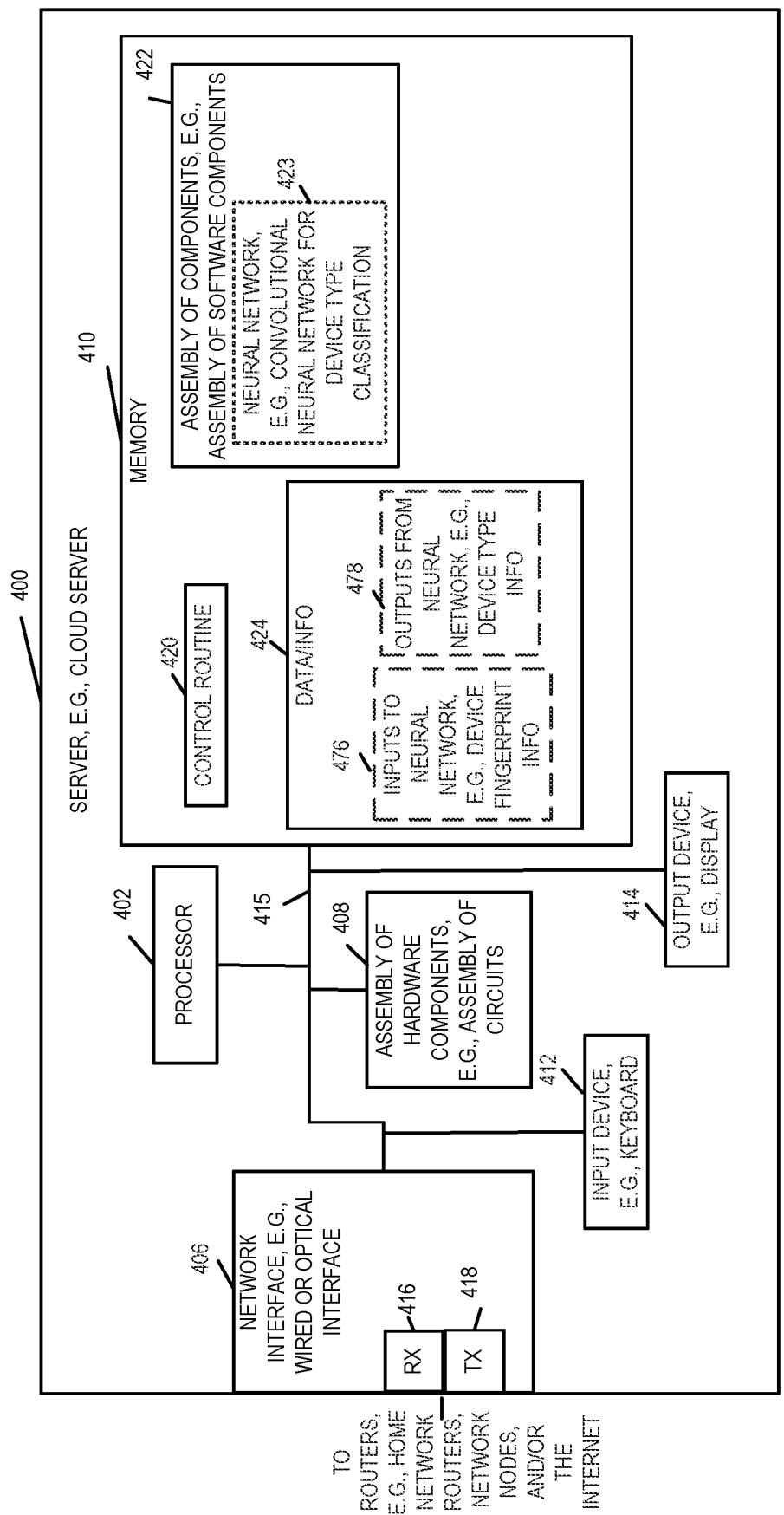
FIG. 4 is a drawing of an exemplary server, e.g., a cloud server, implemented in accordance with an exemplary embodiment.

FIG. 4 is a drawing of an exemplary server 400, e.g., a cloud server, implemented in accordance with an exemplary embodiment. Server 400 is, e.g., server 122 of system 100 of FIG. 1. Server 400 includes a processor 302, e.g., a CPU, a network interface 406, e.g., a wired or optical interface, an assembly of hardware components 408, e.g., an assembly of circuits, memory 410, a input device 412, e.g., a keyboard, and an output device 414, e.g., a display, coupled together via a bus 415 over which the various elements may interchange data and information.

Network interface 406 couples the server 400 to routers, e.g., home network routers, and to other nodes, e.g. network nodes. Network interface 406 includes a receiver 416 and a transmitter 418. Exemplary signals received via receiver 416 include monitored traffic and/or device information sent from a home network router. Exemplary transmitted signals transmitted via transmitter 418 include device type classification information corresponding to a device, said device type classification information being the result of analysis, e.g., via a neural network included in server 400, of the received traffic and/or device information, said device type classification being sent to a home network router.

Memory 410 includes a control routine 420, an assembly of components 422, e.g., an assembly of software components, and data/information 422. In some embodiments, assembly of components 422 includes a neural network 423, e.g., a convolutional neural network for device type classification. In some embodiments, data/information 422 includes inputs 476 to a neural network, e.g., device fingerprint information, and outputs 478 from the neural network, e.g. device type information.

Figure 5A:
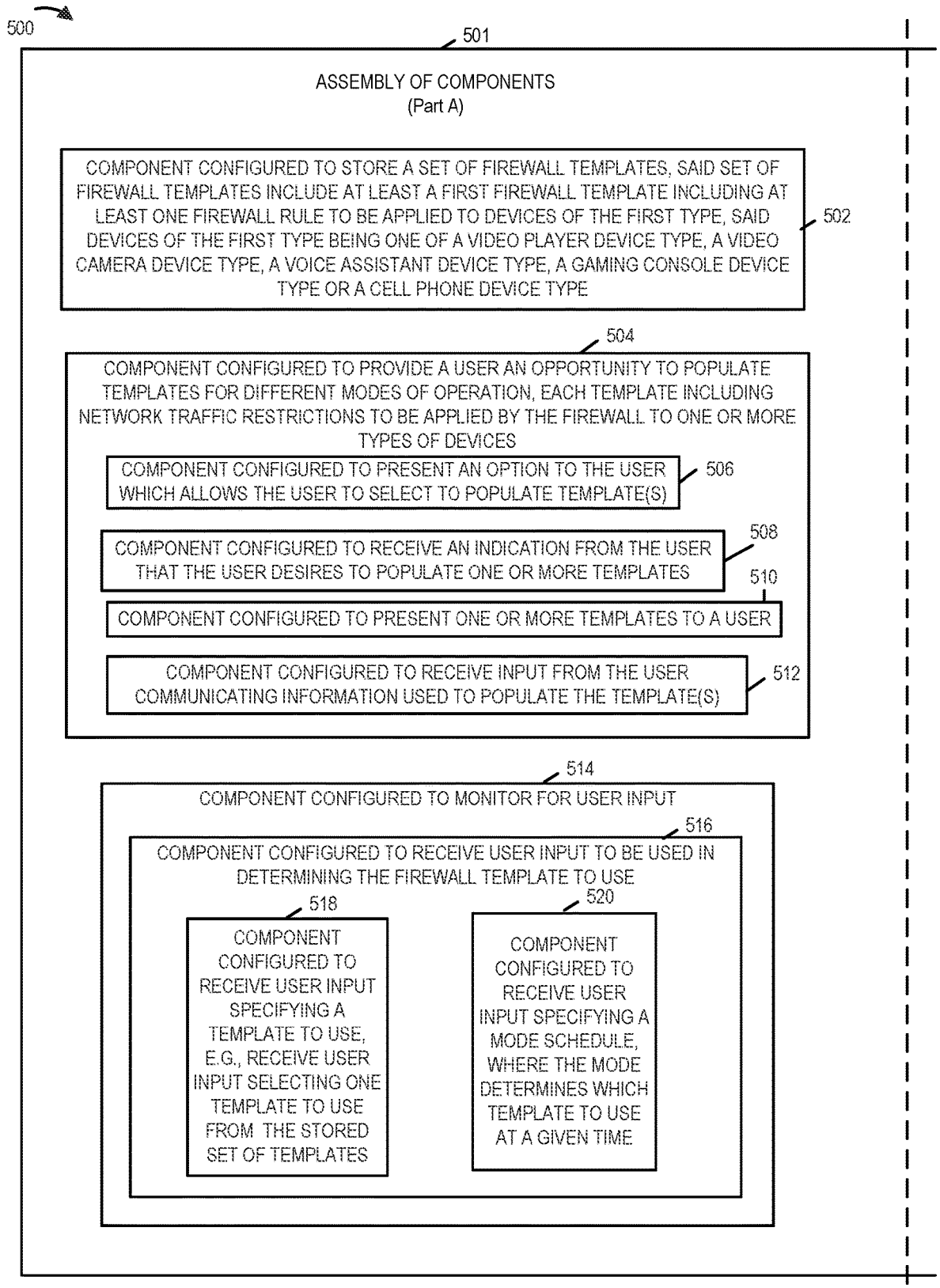
FIG. 5A is a drawing of a first part of an exemplary assembly of components, including components which may be included in a router, e.g., home router, or server, e.g., cloud server, in accordance with various exemplary embodiments.
Figure 5B:
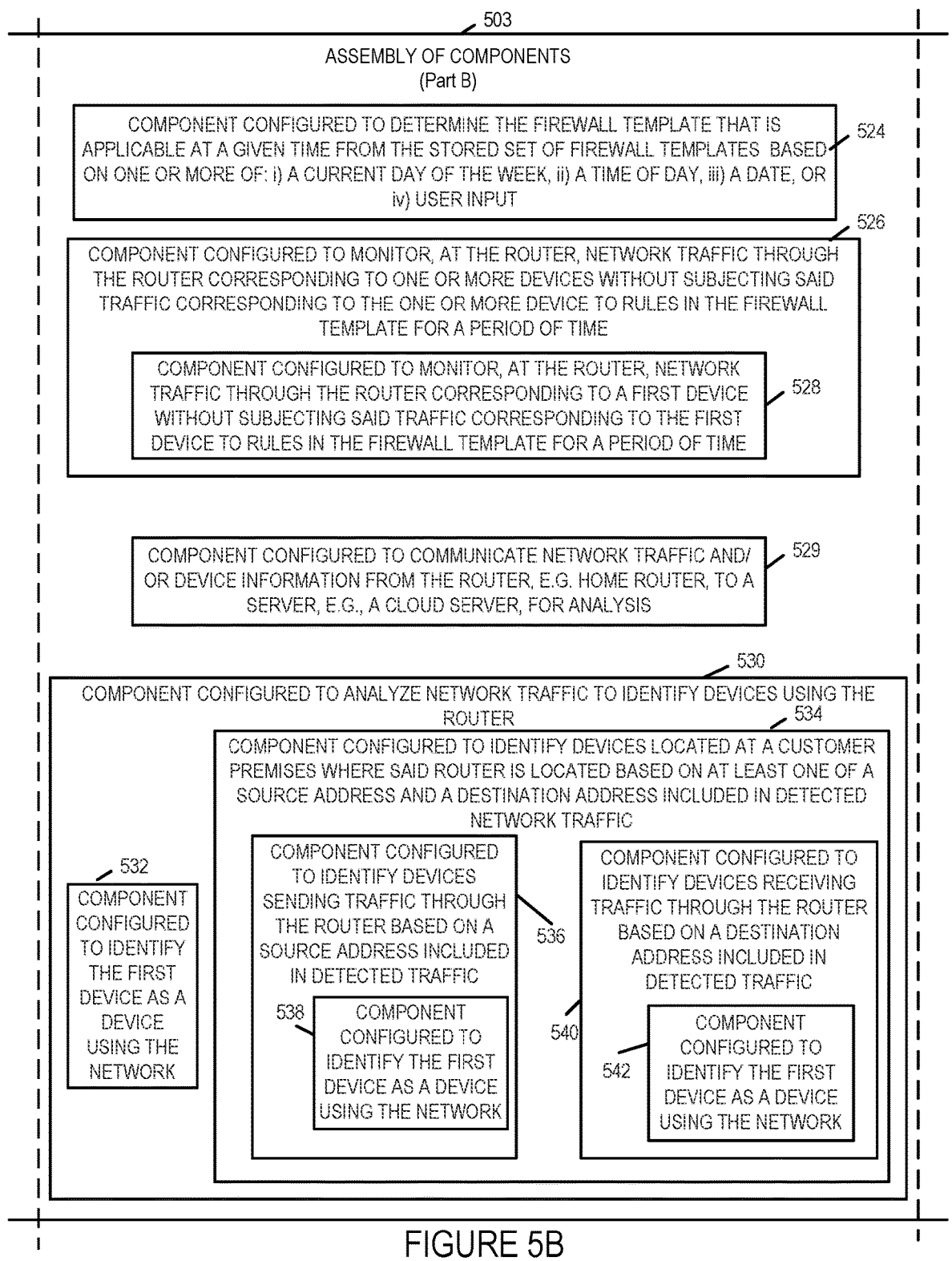
FIG. 5B is a drawing of a second part of an exemplary assembly of components, including components which may be included in a router, e.g., home router, or server, e.g., cloud server, in accordance with various exemplary embodiments.
Figures 5, 5C:
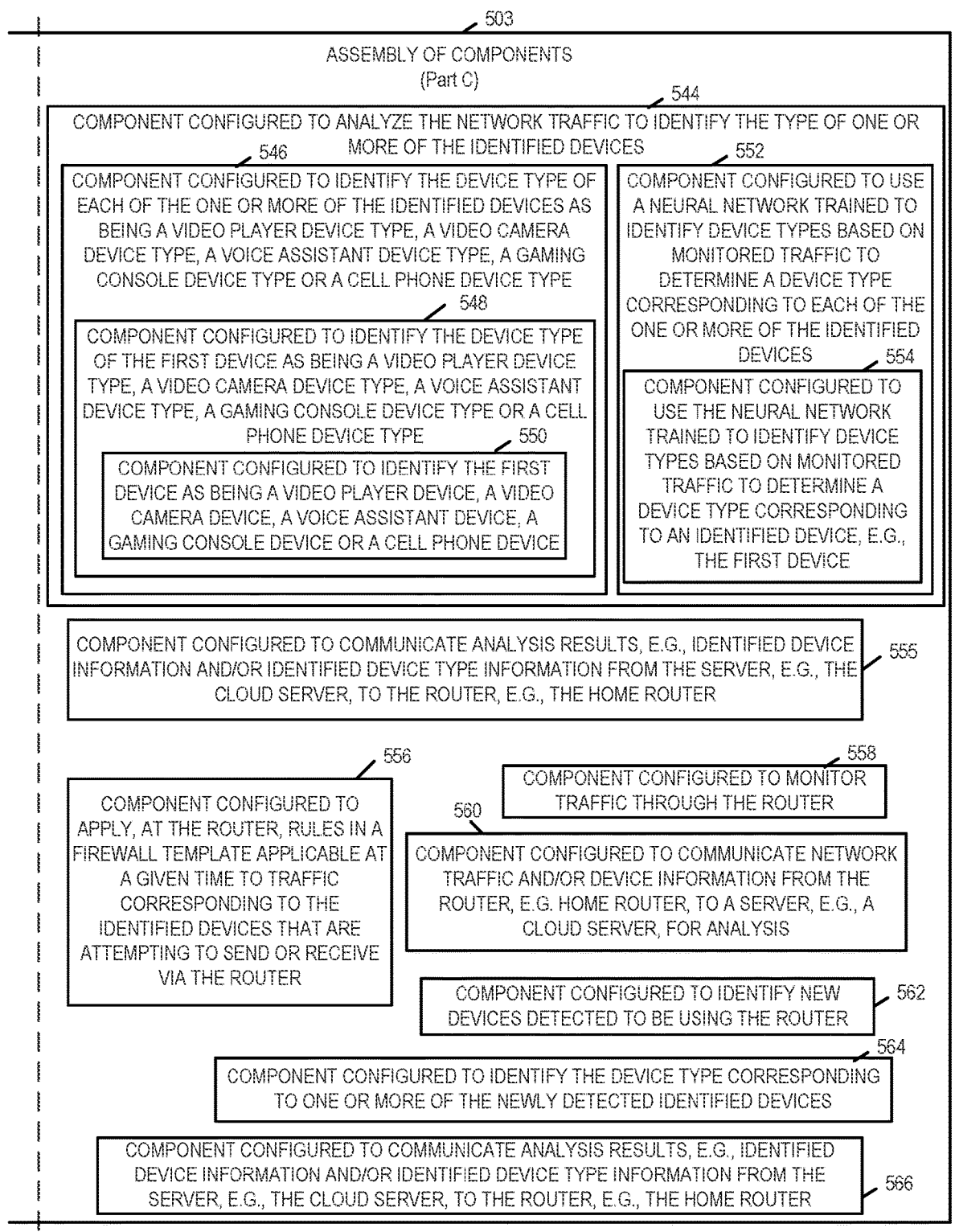
FIG. 5C is a drawing of a third part of an exemplary assembly of components, including components which may be included in a router, e.g., home router, or server, e.g., cloud server, in accordance with various exemplary embodiments.
FIG. 5 comprises the combination of FIG. 5A, FIG. 5B and FIG. 5C.

FIG. 5, comprising the combination of FIG. 5A, FIG. 5B and FIG. 5C, is a drawing of an exemplary assembly of components 500, comprising Part A 501, Part B 503 and Part C 505, said assembly of components 500 including components which may be included in a router, e.g., home router, and/or a server, e.g., cloud server, in accordance with various exemplary embodiments.

Exemplary assembly of components 500 can be, and sometimes is, included in a router, such as the exemplary router 108, e.g., a home router, of FIG. 1 and/or exemplary router 300, e.g., a home router, of FIG. 3, and implement steps of an exemplary method, e.g., steps of the method of the flowchart 200 of FIG. 2 which are performed by the router.

The components in the assembly of components 500 can, and in some embodiments are, implemented fully in hardware within the processor 302, e.g., as individual circuits. The components in the assembly of components 500 can, and in some embodiments are, implemented fully in hardware within the assembly of components 310, e.g., as individual circuits corresponding to the different components. In other embodiments some of the components are implemented, e.g., as circuits, within the processor 302 with other components being implemented, e.g., as circuits within assembly of components 310, external to and coupled to the processor 302. As should be appreciated the level of integration of components on the processor and/or with some components being external to the processor may be one of design choice. Alternatively, rather than being implemented as circuits, all or some of the components may be implemented in software and stored in the memory 312 of the router 300, with the components controlling operation of the router to implement the functions corresponding to the components when the components are executed by a processor, e.g., processor 302. In some such embodiments, the assembly of components 500 is included in the memory 312 as part of assembly of components 332. In still other embodiments, various components in assembly of components 500 are implemented as a combination of hardware and software, e.g., with another circuit external to the processor 302 providing input to the processor 302 which then under software control operates to perform a portion of a component's function. While processor 302 is shown in the FIG. 3 embodiment as a single processor, e.g., computer, it should be appreciated that the processor 302 may be implemented as one or more processors, e.g., computers.

When implemented in software the components include code, which when executed by the processor 302, configure the processor 302 to implement the function corresponding to the component. In embodiments where the assembly of components 500 is stored in the memory 312, the memory 312 is a computer program product comprising a computer readable medium comprising code, e.g., individual code for each component, for causing at least one computer, e.g., processor 302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the router 300, or elements therein such as the processor 302, to perform the functions of corresponding steps illustrated and/or described in the method of one or more of the flowcharts, signaling diagrams and/or described with respect to any of the Figures. Thus the assembly of components 500 includes various components that perform functions of corresponding one or more described and/or illustrated steps of an exemplary method, e.g., steps of the method of flowchart 200 of FIG. 2, which are performed by the router, and/or described or shown with respect to any of the other figures.

Assembly of components 500 includes a component 502 configured to store a set of firewall templates, said set of firewall templates including at least a first firewall template including at least one rule to be applied to device of the first type, said devices of the first type being one of a video player type device, a camera device type, a voice assistant device type, a gaming console device type or a cell phone device type, and a component 504 configured to provide a user, e.g., a supervisory level user, an opportunity to populate templates, e.g., firewall templates, for different modes of operation, each template including network traffic restrictions to be applied by the firewall to one or more types of devices. Component 504 includes a component 506 configured to present an option to the user which allows the user to select to populate templates, e.g., send a message to a CPE of the user communicating the option to select to populate templates, a component 508 configured to receive an indication from the user that the user desires to populate one or more templates, a component 510 configured to present one or more templates to the user, e.g., send a message to the user communicating one or more templates to be populated, and a component 512 configured to receive input from the user communicating information used to populate the template (s). In some embodiments, the information includes device identifiers and/or user identifiers corresponding to sets of selected devices for which particular rules or all the rules in a template are to be applied. In some embodiments, the information includes device identifiers and/or user identifiers corresponding to sets of selected devices which may be whitelisted to overcome one or more firewall rules in a template.

Assembly of components 500 further includes a component 514 configured to monitor for user input. Component 514 includes a component 516 configured to receive user input, e.g., from a supervisory level user, to be used in determining the firewall template to use. Component 516 includes a component 518 configured to receive user input specifying a template to use, e.g., receive user input selecting one template to use from the stored set of firewall templates, and a component 520 configure to receive user input specifying a mode schedule, where the mode determines which template to use at a given time.

Assembly of components 500 further includes a component 524 configured to determine the firewall template that is applicable at a given time from the stored set of firewall templates based on one or more of all of: i) a current day of the week, ii) time of day, iii) a date, or iv) user input, e.g., user can specify template to use or can specify a template or mode schedule where the mode determines which templates to use a given time. Assembly of components 500 further includes a component 526 configured to monitor, at the router, network traffic through the router corresponding to one or more devices without subjecting said traffic corresponding to the one or more devices to rules in the firewall template for a period of time, e.g. for an evaluation time period, said traffic during the evaluation time period to be analyzed to identify devices and device type for an identified device.

Assembly of components 500 further includes a component 529 configured to communicate network traffic and/or device information from the router, e.g. home router, to a server, e.g., a cloud server, for analysis.

Assembly of components 500 further includes a component 530 configured to analyze network traffic to identify devices using the router. Component 530 includes a component 532 configured to identify the first device as a device using the network, and a component 534 configured to identify devices located a customer premises where said router is located based on at least one of a source address and a destination address, e.g., source IP or MAC address for outgoing traffic and destination IP or MAC address for incoming traffic, included in detected network traffic. Component 434 includes a component 536 configured to identify devices sending traffic through the router based on a source address included in detected traffic, and a component 540 configured to identify devices sending traffic through the router based on a destination address included in detected traffic. Component 536 includes a component 538 configured to identify the first device as a device using the network. Component 540 includes a component 542 configured to identify the first device as a device using the network.

Assembly of components 500 further includes a component 544 configured to analyze the network traffic to identify the type of one or more of the identified devices. Component 544 includes a component 546 configured to identify the device type of each if the one or more of the identified devices as being a video player device type, a video camera device type, a voice assistant device type, a gaming console device type, or a cell phone device type. Component 546 includes a component 548 configured to identify the device type of the first device as being a video player device type, a video camera device type, a voice assistant device type, a gaming console device type, or a cell phone device type. Component 548 includes a component 550 configured to identify the first device as being a video player device, a video camera device, a voice assistant device, a gaming console device, or a cell phone device. Component 542 further includes a component 552 configured to use a neural network trained to identify device types based on monitored traffic to determine a device type corresponding to each of one or more of the identified devices. Component 552 includes a component 554 configured to use the neural network trained to identify device types based on monitored traffic to determine a device type corresponding to an identified device, e.g. the first device.

Assembly of components 500 further includes a component 555 configured to communicate analysis results, e.g., identified device information and/or identified device type information from the server, e.g., the cloud server, to the router, e.g. the home router.

Assembly of components further includes a component 556 configured to apply, at the router, rules in a firewall template applicable at a given time to traffic corresponding to the identified devices, e.g., the one or more or all of the identified devices for which a device type was identified, that are attempting to send or receive via the router.

Assembly of components 500 includes a component 558 configured to monitor traffic through the router, a component 560 configured to communicate network traffic and/or device information from the router, e.g., home router, to a server, e.g. a cloud server, for analysis, a component 562 configured to identify new devices detected to be using the router, a component 564 configured to identify the device type corresponding to one or more or all of the newly detected identified devices, and a component 566 configured to communicate analysis results, e.g. device information and/or identified device type information from the server, e.g., the cloud server, to the router, e.g., the home router.

In some embodiments, one or more of the components, e.g., components which perform analysis, within exemplary assembly of components 500 can be, and sometimes are, included in a server, such as the exemplary server 122, e.g., a cloud server, of FIG. 1 and/or exemplary server 400, e.g., a cloud server, of FIG. 4, and implement steps of an exemplary method, e.g., steps of the method of the flowchart 200 of FIG. 2 which are performed by the server.

The components in the assembly of components 500 can, and in some embodiments are, implemented fully in hardware within the processor 402, e.g., as individual circuits. The components in the assembly of components 500 can, and in some embodiments are, implemented fully in hardware within the assembly of components 408, e.g., as individual circuits corresponding to the different components. In other embodiments some of the components are implemented, e.g., as circuits, within the processor 402 with other components being implemented, e.g., as circuits within assembly of components 408, external to and coupled to the processor 402. As should be appreciated the level of integration of components on the processor and/or with some components being external to the processor may be one of design choice. Alternatively, rather than being implemented as circuits, all or some of the components may be implemented in software and stored in the memory 410 of the server 400, with the components controlling operation of the router to implement the functions corresponding to the components when the components are executed by a processor, e.g., processor 402. In some such embodiments, the assembly of components 500 is included in the memory 410 as part of assembly of components 422. In still other embodiments, various components in assembly of components 500 are implemented as a combination of hardware and software, e.g., with another circuit external to the processor 402 providing input to the processor 402 which then under software control operates to perform a portion of a component's function. While processor 402 is shown in the FIG. 4 embodiment as a single processor, e.g., computer, it should be appreciated that the processor 402 may be implemented as one or more processors, e.g., computers.

When implemented in software the components include code, which when executed by the processor 402, configure the processor 402 to implement the function corresponding to the component. In embodiments where the assembly of components 500 is stored in the memory 410, the memory 410 is a computer program product comprising a computer readable medium comprising code, e.g., individual code for each component, for causing at least one computer, e.g., processor 402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the server 400, or elements therein such as the processor 402, to perform the functions of corresponding steps illustrated and/or described in the method of one or more of the flowcharts, signaling diagrams and/or described with respect to any of the Figures. Thus the assembly of components 500 includes various components that perform functions of corresponding one or more described and/or illustrated steps of an exemplary method, e.g., steps of the method of flowchart 200 of FIG. 2, which are performed by the server, and/or described or shown with respect to any of the other figures.

Various aspects and/or features of some embodiments of the present invention are further discussed below. Some embodiments of the present invention are directed to a system or device and/or a method for using modes to control the behavior of Internet devices in a home. In some embodiments, modes are routines or rules that define what type of devices can access the Internet, for how long, and what services are enabled. Modes are an easy way for a user to select many rules and networking configurations with ease. New modes can be, and sometimes are added or updated, e.g., by a Gateway provider or Internet Service Provider. Exemplary modes, which may be, and sometimes are, implemented in some embodiments of the present invention, are described below.

Modes:

Concentrating mode—Concentrating mode blocks Internet access for all devices for a defined duration. For example, a user turns on Concentrating mode with a duration of 30 minutes. After 30 minutes, devices are able to access the Internet.

Quality Time Mode—Quality Time mode blocks Internet access for all devices. Exceptions can be set for one or more devices. For example, a user sets the mode to Quality Time and selects an exception for the Roku device, so that they can watch a movie without distraction. Quality time can also be set on a user-by-user basis.

Metering Mode—When Metering mode is set, all devices are permitted to use the Internet up to a predefined limit. For example the head of household sets the mode to Metering mode with a limit of 2 hours of social media for his child's mobile device. After 2 hours, social media is blocked. All metering time counts restart every 24 hours.

Night Mode—Night mode stops all streaming video players, gaming consoles, mobile phones, computers, and streaming music players.

Off the Record Mode—Off the Record mode stops video cameras, voice assistants, and any other devices that record audio and video and save it to the cloud.

In some embodiments, an exemplary system includes a router with hardware and software, cloud servers and software, and a convolutional neural network for machine learning and classification of user device types, such as a gaming console, smart light bulb, streaming video player, mobile phone, etc. End user device is identified through fingerprinting by capturing data elements such as the MAC address, hostname, supported network protocols, open ports, netflow data, user agent information, TCP/IP header information, and other wireless networking information. The output of the neural network is the device type classification and relative confidence level. In some embodiments, the device type classification corresponds to the capabilities of the device, not just the static characteristics of the device. For example a laptop can be used to view social media, can stream video, can be used for video recording, and can play streaming audio. This way a single user device can exist across multiple device type classifications.

In some embodiments, when new devices join the network, key data elements are collected and input into the convolutional neural network. This allows for the system to classify user devices even when it has never seen this type of device before and automatically build the firewall rules (mode policies) for each rule as devices join and leave the network. The device type classifications are used to build modes corresponding to the aforementioned policies. For example a policy corresponding to the Off the Record mode, sets a firewall rule for each MAC address/IP Address for each device capable of video or audio recording, as determined by the classification, and blocks the upstream Internet traffic on that device on that communication port.

The neural network is trained using a supervised learning process with user device fingerprinting data and the device type capabilities classification. The trained model can be stored on the router, given hardware with sufficient capabilities, or stored in the cloud.

Figure 6:
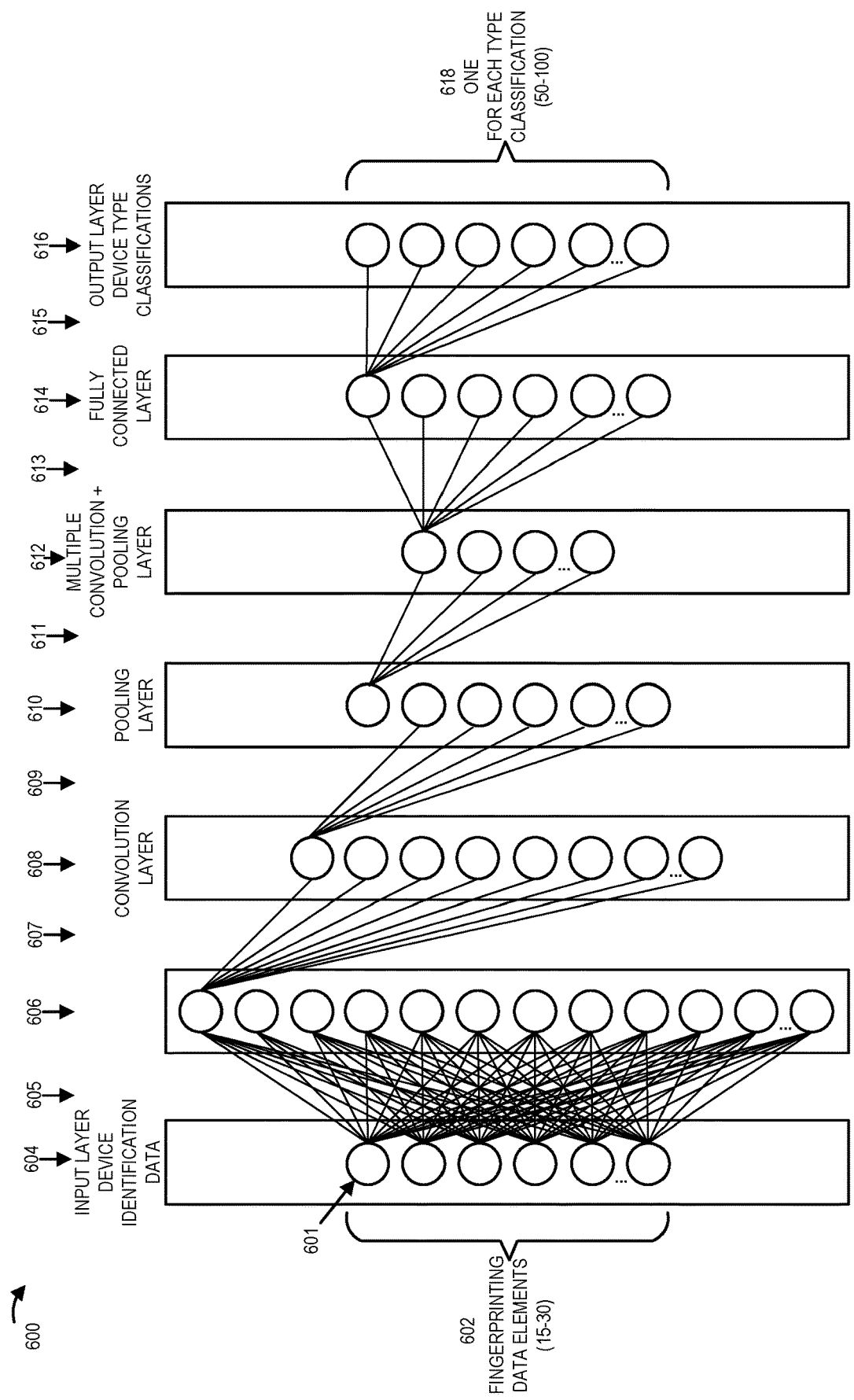
FIG. 6 is a drawing illustrating an example of a neural network for device type classification in accordance with an exemplary embodiment.

FIG. 6 is a drawing 600 illustrating an example of a neural network for device type classification in accordance with an exemplary embodiment. Each circle, e.g., circle 601 represents a neuron of the network. Grouping 602 indicates a plurality of fingerprinting data elements, e.g., 15-30 fingerprinting data elements which are input. The exemplary convolution neural network of FIG. 6 includes a plurality of layers coupled together (input layer 604 which receives device identification data, layer 606, convolutional layer 608, pooling layer 610, multiple convolutional+pooling layers 612, fully connected layer 612, and output layer 614 including device type classifications. Grouping 616 indicates that there are a plurality of device type classification outputs, e.g., 50-100 device type classification outputs, one for each device type classification. Area 605 in drawing 600 shows the connections between neurons of input layer 604 and neurons of layer 606. Area 607 in drawing 600 shows some exemplary connections between neurons of layer 606 and neurons of convolutional layer 608; connections between each of the neurons of layer 606 and neurons of layer 608 have been omitted from the drawing for simplicity, but are implemented in a similar manner as shown between layers 604 and 606, e.g. in accordance with the training Area 609 in drawing 600 shows some exemplary connections between neurons of convolutional layer 608 and neurons of pooling layer 610; connections between each of the neurons of layer 608 and neurons of layer 610 have been omitted from the drawing for simplicity, but are implemented in a similar manner as shown between layers 604 and 606, e.g. in accordance with the training. Area 611 in drawing 600 shows some exemplary connections between neurons of pooling layer 610 and neurons of multiple convolutional+pooling layer 612; connections between each of the neurons of layer 610 and neurons of layer 612 have been omitted from the drawing for simplicity, but are implemented in a similar manner as shown between layers 604 and 606, e.g. in accordance with the training Area 613 in drawing 600 shows some exemplary connections between neurons of multiple convolutional+pooling layer 612 and neurons of fully connected layer 614; connections between each of the neurons of layer 612 and neurons of layer 614 have been omitted from the drawing for simplicity, but are implemented in a similar manner as shown between layers 604 and 606, e.g. in accordance with the training Area 615 in drawing 600 shows some exemplary connections between neurons of fully connected layer 614 and neurons of output layer 616; connections between each of the neurons of layers 614 and neurons of layer 616 have been omitted from the drawing for simplicity, but are implemented in a similar manner as shown between layers 604 and 606, e.g. in accordance with the training.

An exemplary sequence, implemented in some embodiments of the present invention, of enabling and disabling a mode will now be described.

Exemplary preconditions to enabling/disabling a mode will now be listed.

1. When a new user device joins the network fingerprinting data elements are collected and transmitted to the ISP cloud for device identification and device capabilities classification.
2. The MAC address, device type, and list of device capabilities are persisted for the user device for the network at the premises.
3. Firewall rule templates are created corresponding to each Mode. For example, the firewall template for Off The Record:
   a. OUTPUT tcp mac source<MAC address of user device capable of audio or video recording>DROP
   b. OUTPUT tcp mac source<MAC address of user device capable of audio or video recording>DROP An exemplary procedure for enabling a mode will now be described.
1. User selects a mode, either through a voice command to a smart assistant, through a voice command on a voice-enabled remote, in a mobile app, or another user interface such as a trigger.
2. Using the pre-defined firewall rule template for the user selected mode, the router populates the MAC addresses for all devices currently on the network matching the user device type capability classification.
3. The firewall rules are applied using the populated template.
4. Firewall restricts upstream or downstream communication according to the updated firewall rules.

An exemplary procedure for disabling a mode will now be described.
1. User selects a different mode or turns off all modes.
2. The firewall rules that were enabled by the mode are removed and the firewall no longer blocks any upstream or downstream communication for those user devices.

Various exemplary embodiments, implemented in accordance with the present invention, puts the user back in control of their time by controlling the behavior of each of their Internet devices. Complex networking configurations and rules are simplified into modes and users can select a mode, e.g., with the touch of a button, requiring no technical or networking experience. Some exemplary embodiments, implemented in accordance with present invention, use machine learning to create the firewall rules on the user's behalf; removing the complexity of defining or building the firewall rules by adding user devices to every firewall rule, each and every time a device is added or removed from the network.

Various embodiments, in accordance with the present invention provide better control, e.g., more universal control, of a firewall, with respect to multiple devices, than existing approaches. In contrast to various embodiments implemented in accordance with the present invention, existing solutions allow limited control to a firewall, e.g. allowing enabling/disabling of a firewall at the device level. In the existing solutions approach a user would typically have to individually select and configure each device, to achieve the same effect as can be achieved in a novel embodiment implemented in accordance with the present invention in which selecting a single mode is applied to multiple devices, e.g., multiple devices of the same type. Thus various exemplary embodiments, implemented in accordance with the present invention can reduce the level of complexity for the user, the amount of time required by the user to configure a firewall, and the amount of overhead control signaling for the firewall, by significant amounts, with respect to exiting approaches. In addition, the controls of a firewall in existing solutions are not as fine grained as the controls of a firewall implemented in various embodiments of the present invention.

Numbered List of Exemplary Method Embodiments

Method Embodiment 1 A method, the method comprising: analyzing (230) network traffic on a network to identify devices using a router; analyzing (244) the network traffic to identify the type of one or more of the identified devices; and applying (256), at the router, rules in a firewall template applicable at a given time to traffic corresponding to identified devices that are attempting to send or receive via the router.

Method Embodiment 2 The method of Method Embodiment 1, further comprising, prior to applying (256) the rules in the firewall template applicable at a given time: storing (202) a set of firewall templates, said set of firewall templates including at least a first firewall template including at least one firewall rule to be applied to devices of a first type, said devices of a first type being one of a video player device type, video camera device type, a voice assistant device type, a gaming console device type or a cell phone device type; and determining (224) the firewall template that is applicable at a given time from the stored set of firewall templates based on one or more of: i) a current day of the week, ii) a time of day, iii) a date, or iv) user input (user can specify template to use or can specify a template or mode schedule where the mode determines which templates to use a given time).

Method Embodiment 3 The method of Method Embodiment 1, further comprising, prior to applying (256) the rules in the firewall template at a given time to traffic corresponding to identified devices that are attempting to send or receive via the router, said devices including a first device: monitoring (228), at the router, network traffic through the router corresponding to the first device without subjecting said traffic corresponding to the first device to rules in the firewall template for a period of time; wherein analyzing (230) the network traffic to identify devices using the router includes identifying (232) the first device as a device using the network; and wherein analyzing (244) the network traffic to identify the type of one or more of the identified devices include identifying (248) the device type of the first device as being a video player device type, a video camera device type, a voice assistant device type, a gaming console device type, or a cell phone device type.

Method Embodiment 4 The method of Method Embodiment 3, wherein analyzing (230) the network traffic to identify devices using the router includes identifying (234) devices located at a customer premises where said router is located based on at least one of a source address and a destination address (e.g., source IP or MAC address for outgoing traffic and destination IP or MAC address for incoming traffic) included in detected network traffic.

Method Embodiment 5 The method of Method Embodiment 4, wherein analyzing (230) the network traffic to identify devices using the router includes identifying (236) devices sending traffic through said router based on a source address included in detected traffic.

Method Embodiment 6 The method of Method Embodiment 4, wherein analyzing (230) the network traffic to identify devices using the router includes identifying (240) devices receiving traffic through said router based on a destination address included in detected traffic.

Method Embodiment 7 The method of Method Embodiment 3, wherein analyzing (244) the network traffic to identify the type of one or more identified devices includes using (254) a neural network trained to identify device types based on monitored traffic to determine a device type corresponding to an identified device.

Method Embodiment 8 The method of Method Embodiment 4, further comprising: providing (236) a user an opportunity to populate templates for different modes of operation, each template including network traffic restrictions to be applied by the firewall for one or more types of devices.

Method Embodiment 9 The method of Method Embodiment 8 wherein at least one firewall template includes a whitelist of devices which are not to be subject to restrictions imposed by rules in said at least one firewall template, a device on the whitelist being identified on said whitelist by an IP address, MAC address or device identifier.

Method Embodiment 10 The method of Method Embodiment 1 wherein the firewall template applicable at the given time is a first template that corresponds to a concentrating mode of operation in which devices of different types listed in the template are to be blocked from accessing the Internet for a specified period of time (e.g., devices are block from the Internet for a particular specified time period during a day or for period of time of having a specific duration, e.g., 30 minutes from the time concentrating mode is activated).

Method Embodiment 11 The method of Method Embodiment 1, wherein the firewall template applicable at the given time is a first template that corresponds to a quality time mode in which Internet access is blocked for device types or specific devices identified in the template as devices which are to be permitted Internet access during quality time mode operation.

Method Embodiment 12 The method of Method Embodiment 1 wherein the firewall template applicable at the given time is a first template that corresponds to a metering mode of operation in which devices of at least one type are limited to a specified amount of access to one or more networks outside the customer premise (e.g., the Internet) within a predetermined recurring time interval (24 hour period) (for example cell phones may be and sometimes are limited to a maximum of 2 hours Internet access per day).

Method Embodiment 13 The method of Method Embodiment 1, wherein the firewall template applicable at the given time is a first template that corresponds to a night mode in which video player type devices, gaming console type devices, mobile phone devices, computer type device and streaming music player devices are blocked by the router from communicating through the router.

Method Embodiment 14 The method of Method Embodiment 1, wherein the firewall template applicable at the given time is a first template that corresponds to an off the record mode in which one, multiple or all of: audio recording type devices, video recording type devices, or audio and video recording type devices are blocked from communicating through the router.

Method Embodiment 15 The method of Method Embodiment 1, wherein said router is a home router.

Method Embodiment 16 The method of Method Embodiment 1, wherein said analyzing (244) the network traffic to identify the type of one or more of the identified devices, is performed in the router.

Method Embodiment 17 The method of Method Embodiment 1, wherein said analyzing (244) the network traffic to identify the type of one or more of the identified devices, is performed in a server.

Method Embodiment 18 The method of Method Embodiment 1, wherein said server is a cloud based server.

Method Embodiment 19 The method of Method Embodiment 1, wherein said server (122) is an Internet Service Provider (ISP) server.

Method Embodiment 20. The method of Method Embodiment 19, wherein said server (122) is a cloud based server.

Numbered List of Exemplary Apparatus Embodiments

Apparatus Embodiment 1 A router (300) comprising: a firewall; and a processor (302) configured to: analyze (230) network traffic on a network to identify devices using a router; analyze (244) the network traffic to identify the type of one or more of the identified devices; and apply (256), at the router, rules in a firewall template applicable at a given time to traffic corresponding to identified devices that are attempting to send or receive via the router.

Apparatus Embodiment 2 The router (300) of Apparatus Embodiment 1, wherein said processor (302) is further configured to: store (202) a set of firewall templates, said set of firewall templates including at least a first firewall template including at least one firewall rule to be applied to devices of a first type, said devices of a first type being one of a video player device type, video camera device type, a voice assistant device type, a gaming console device type or a cell phone device type; and determine (224) the firewall template that is applicable at a given time from the stored set of firewall templates based on one or more of: i) a current day of the week, ii) a time of day, iii) a date, or iv) user input (user can specify template to use or can specify a template or mode schedule where the mode determines which templates to use a given time), said storing a set of firewall templates and said determining the firewall template that is applicable at a given time, being performed prior to applying (256) the rules in the firewall template applicable at the given time.

Apparatus Embodiment 3 The router (300) of Apparatus Embodiment 1, wherein said processor (302) is further configured to: monitor (228), at the router, network traffic through the router corresponding to a first device without subjecting said traffic corresponding to the first device to rules in the firewall template for a period of time, said first device being one of said devices; identify (232) the first device as a device using the network as part of being configured to analyze (230) the network traffic to identify devices using the router; and identify (248) the device type of the first device as being a video player device type, a video camera device type, a voice assistant device type, a gaming console device type, or a cell phone device type, as part of being configured to analyze (244) the network traffic to identify the type of one or more of the identified devices, said monitoring, said identifying the first device, and said identifying the device type of the first device being performed prior to applying (256) the rules in the firewall template at a given time to traffic corresponding to identified devices that are attempting to send or receive via the router.

Apparatus Embodiment 4 The router (300) of Apparatus Embodiment 3, wherein said processor (302) is further configured to: identify (234) devices located at a customer premises where said router is located based on at least one of a source address and a destination address (e.g., source IP or MAC address for outgoing traffic and destination IP or MAC address for incoming traffic) included in detected network traffic, as part of being configured to analyze (230) the network traffic to identify devices using the router.

Apparatus Embodiment 5 The router (300) of Apparatus Embodiment 4, wherein said processor (302) is further configured to: identify (236) devices sending traffic through said router based on a source address included in detected traffic, as part of being configured to analyze (230) the network traffic to identify devices using the router.

Apparatus Embodiment 6 The router (300) of Apparatus Embodiment 4, wherein said processor (302) is further configured to: identify (240) devices receiving traffic through said router based on a destination address included in detected traffic, as part of being configured to analyze (230) the network traffic to identify devices using the router.

Apparatus Embodiment 7 The router (300) of Apparatus Embodiment 3, wherein said processor (302) is further configured to: use (254) a neural network trained to identify device types based on monitored traffic to determine a device type corresponding to an identified device, as part of being configured to analyze (244) the network traffic to identify the type of one or more identified devices.

Apparatus Embodiment 8 The router (300) of Apparatus Embodiment 4, wherein said processor (302) is further configured to: provide (236) a user an opportunity to populate templates for different modes of operation, each template including network traffic restrictions to be applied by the firewall for one or more types of devices.

Apparatus Embodiment 9 The router (300) of Apparatus Embodiment 8 wherein at least one firewall template includes a whitelist of devices which are not to be subject to restrictions imposed by rules in said at least one firewall template, a device on the whitelist being identified on said whitelist by an IP address, MAC address or device identifier.

Apparatus Embodiment 10 The router (300) of Apparatus Embodiment 1 wherein the firewall template applicable at the given time is a first template that corresponds to a concentrating mode of operation in which devices of different types listed in the template are to be blocked from accessing the Internet for a specified period of time (e.g., devices are block from the Internet for a particular specified time period during a day or for period of time of having a specific duration, e.g., 30 minutes from the time concentrating mode is activated).

Apparatus Embodiment 11 The router (300) of Apparatus Embodiment 1, wherein the firewall template applicable at the given time is a first template that corresponds to a quality time mode in which Internet access is blocked for device types or specific devices identified in the template as devices which are to be permitted Internet access during quality time mode operation.

Apparatus Embodiment 12 The router (300) of Apparatus Embodiment 1 wherein the firewall template applicable at the given time is a first template that corresponds to a metering mode of operation in which devices of at least one type are limited to a specified amount of access to one or more networks outside the customer premise (e.g., the Internet) within a predetermined recurring time interval (24 hour period) (for example cell phones may be and sometimes are limited to a maximum of 2 hours Internet access per day).

Apparatus Embodiment 13 The router (300) of Apparatus Embodiment 1, wherein the firewall template applicable at the given time is a first template that corresponds to a night mode in which video player type devices, gaming console type devices, mobile phone devices, computer type device and streaming music player devices are blocked by the router from communicating through the router.

Apparatus Embodiment 14 The router (300) of Apparatus Embodiment 1, wherein the firewall template applicable at the given time is a first template that corresponds to an off the record mode in which one, multiple or all of: audio recording type devices, video recording type devices, or audio and video recording type devices are blocked from communicating through the router.

Apparatus Embodiment 15 The router (300) of Apparatus Embodiment 1, wherein said router is a home router.

Numbered List of Exemplary System Embodiments

System Embodiment 1 A system (100) comprising: a router (108) including: a firewall; and a first processor (302) configured to: apply (256), at the router, rules in a firewall template applicable at a given time to traffic corresponding to identified devices that are attempting to send or receive via the router; and a server (122) including: a second processor (402) configured to analyze (230) network traffic on a network to identify devices using a router; and analyze (244) the network traffic to identify the type of one or more of the identified devices.

System Embodiment 2 The system (100) of System Embodiment 1, wherein said first processor (302) is further configured to: store (202) a set of firewall templates, said set of firewall templates including at least a first firewall template including at least one firewall rule to be applied to devices of a first type, said devices of a first type being one of a video player device type, video camera device type, a voice assistant device type, a gaming console device type or a cell phone device type; and determine (224) the firewall template that is applicable at a given time from the stored set of firewall templates based on one or more of: i) a current day of the week, ii) a time of day, iii) a date, or iv) user input (user can specify template to use or can specify a template or mode schedule where the mode determines which templates to use a given time); and wherein said storing (202) a set of firewall templates and said determining (224) the firewall template that is applicable at a given time are performed prior to applying (256) the rules in the firewall template applicable at a given time.

System Embodiment 3 The system (100) of System Embodiment 1, wherein said first processor (302) is further configured to: monitor (228), at the router, network traffic through the router corresponding to a first device without subjecting said traffic corresponding to the first device to rules in the firewall template for a period of time, said first device being one of said devices; wherein said second processor (402) is further configured to: identify (232) the first device as a device using the network as part of being configured to analyze (230) the network traffic to identify devices using the router; and identify (248) the device type of the first device as being a video player device type, a video camera device type, a voice assistant device type, a gaming console device type, or a cell phone device type, as part of being configured to analyze (244) the network traffic to identify the type of one or more of the identified devices, said monitoring, identifying the first device and identifying the device type of the first device being performed prior to said applying (256) the rules in the firewall template at a given time to traffic corresponding to identified devices that are attempting to send or receive via the router.

System Embodiment 4 The system (100) of System Embodiment 3, wherein said second processor (402) is further configured to: identify (234) devices located at a customer premises where said router is located based on at least one of a source address and a destination address (e.g., source IP or MAC address for outgoing traffic and destination IP or MAC address for incoming traffic) included in detected network traffic, as part of being configured to analyze (230) the network traffic to identify devices using the router.

System Embodiment 5 The system (100) of System Embodiment 4, wherein said second processor (402) is further configured to: identify (236) devices sending traffic through said router based on a source address included in detected traffic, as part of being configured to analyze (230) the network traffic to identify devices using the router.

System Embodiment 6 The system (100) of System Embodiment 4, wherein said second processor (402) is further configured to: identify (240) devices receiving traffic through said router based on a destination address included in detected traffic, as part of being configured to analyze (230) the network traffic to identify devices using the router.

System Embodiment 7 The system (100) of System Embodiment 3, wherein said second processor (402) is further configured to: use (254) a neural network trained to identify device types based on monitored traffic to determine a device type corresponding to an identified device, as part of being configured to analyze (244) the network traffic to identify the type of one or more identified devices.

System Embodiment 8 The system (100) of System Embodiment 4, wherein said first processor (302) is further configured to: provide (236) a user an opportunity to populate templates for different modes of operation, each template including network traffic restrictions to be applied by the firewall for one or more types of devices.

System Embodiment 9 The system (100) of System Embodiment 8 wherein at least one firewall template includes a whitelist of devices which are not to be subject to restrictions imposed by rules in said at least one firewall template, a device on the whitelist being identified on said whitelist by an IP address, MAC address or device identifier.

System Embodiment 10 The system (100) of System Embodiment 1 wherein the firewall template applicable at the given time is a first template that corresponds to a concentrating mode of operation in which devices of different types listed in the template are to be blocked from accessing the Internet for a specified period of time (e.g., devices are block from the Internet for a particular specified time period during a day or for period of time of having a specific duration, e.g., 30 minutes from the time concentrating mode is activated).

System Embodiment 11 The system (100) of System Embodiment 1, wherein the firewall template applicable at the given time is a first template that corresponds to a quality time mode in which Internet access is blocked for device types or specific devices identified in the template as devices which are to be permitted Internet access during quality time mode operation.

System Embodiment 12 The system (100) of System Embodiment 1 wherein the firewall template applicable at the given time is a first template that corresponds to a metering mode of operation in which devices of at least one type are limited to a specified amount of access to one or more networks outside the customer premise (e.g., the Internet) within a predetermined recurring time interval (24 hour period) (for example cell phones may be and sometimes are limited to a maximum of 2 hours Internet access per day).

System Embodiment 13 The system (100) of System Embodiment 1, wherein the firewall template applicable at the given time is a first template that corresponds to a night mode in which video player type devices, gaming console type devices, mobile phone devices, computer type device and streaming music player devices are blocked by the router from communicating through the router.

System Embodiment 14 The system (100) of System Embodiment 1, wherein the firewall template applicable at the given time is a first template that corresponds to an off the record mode in which one, multiple or all of: audio recording type devices, video recording type devices, or audio and video recording type devices are blocked from communicating through the router.

System Embodiment 15 The system (100) of System Embodiment 1, wherein said router (108) is a home router.

System Embodiment 16 The system (100) of System Embodiment 1, wherein said server (122) is a cloud based server.

System Embodiment 17 The system (100) of System Embodiment 1, wherein said server (122) is an Internet Service Provider (ISP) server.

System Embodiment 18 The system (100) of System Embodiment 17, wherein said server (122) is a cloud based server.

Numbered List of Exemplary Computer Readable Medium Embodiments

Computer Readable Medium Embodiment 1 A non-transitory computer readable medium (312) including a first set of computer executable instructions which when executed by a processor (302) of a router (300) cause the router (300) to perform the steps of: analyzing (230) network traffic on a network to identify devices using a router; analyzing (244) the network traffic to identify the type of one or more of the identified devices; and applying (256), at the router, rules in a firewall template applicable at a given time to traffic corresponding to identified devices that are attempting to send or receive via the router.

The techniques of various embodiments may be implemented using software, hardware and/or a combination of software and hardware. Various embodiments are directed to apparatus, routers, e.g., home network routers such as, e.g., WiFi routers, servers, e.g., cloud servers, ISP servers, e.g., user devices such as a user equipment (UE) device, base stations such as a eNB, gNB or ng-eNB, large cell base station, small cell base stations, femto cell base stations, pico cell base stations, network nodes, an AMF device, core network nodes, a network management node, a SON node, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating routers, e.g., home network routers, servers, e.g., cloud servers, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, monitoring, analysis, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such a routers, e.g., home network routers, a server, e.g., cloud server, a controller or other device described in the present application. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method, the method comprising:
   operating a firewall device at a first customer premises to pass network traffic corresponding to at least a first device as part of the first device communicating over a network with at least one device outside the first customer premises without applying firewall rules to the traffic corresponding to the first device
   monitoring, at the firewall device, network traffic through the firewall device corresponding to the first device communicating over the network with at least one device outside the first customer premises without subjecting said traffic corresponding to the first device to rules in a firewall template for a period of time;
   analyzing, prior to applying firewall rules at the firewall device to traffic corresponding to the first device communicating over the network with at least one device outside the first customer premises, the network traffic corresponding to the first device passing through the firewall device, to identify a device type of the first device, said analyzing identifying the first device as a first type device; and
   applying, at the firewall device, a first rule in a firewall template applicable to devices of the first type, said applying the first rule including applying the first rule to traffic corresponding to the first device when the first device attempts to send or receive traffic via the firewall device, said applying of the first rule following identifying the first device as a device of the first type based on traffic passed through the firewall device.

2. The method of claim 1, further comprising, prior to applying the first rule to the traffic corresponding to the first device:

storing a set of firewall templates, said set of firewall templates including at least a first firewall template including at least one firewall rule to be applied to devices of the first type, said devices of the first type being one of a video player device type, video camera device type, a voice assistant device type, a gaming console device type or a cell phone device type; and determining the firewall template that is applicable at a given time from the stored set of firewall templates based on one or more of: i) a current day of the week, ii) a time of day, iii) a date, or iv) user input.

3. The method of claim 1,
wherein analyzing the network traffic to identify the type of one or more of the identified devices includes identifying the device type of the first device as being a video camera device type or a voice assistant device type.

4. The method of claim 3, further comprising:
identifying devices located at said first customer premises where said firewall device is located based on a destination address included in detected network traffic, said first device being an identified device.

5. The method of claim 3, wherein analyzing the network traffic corresponding to the first device to identify the device type of the first device includes using a neural network trained to identify device types based on monitored.

6. The method of claim 1, further comprising:
providing a user an opportunity to populate templates for different modes of operation, each template including network traffic restrictions to be applied by the firewall for one or more types of devices.

7. The method of claim 1, wherein the applied firewall template includes information indicating different types of device to be blocked from accessing the Internet for a specified period of time, said first type device being one of the types of devices to be blocked for the specified period of time.

8. The method of claim 1, wherein the applied firewall template applicable is a first template that indicates specific devices which are to be permitted Internet access.

9. The method of claim 1, wherein the applied firewall template limits devices of the first type to a specified amount of access to one or more networks outside the customer premises within a predetermined recurring time.

10. The method of claim 1, wherein the applied firewall template which blocks video player type devices, gaming console type devices, mobile phone devices, computer type devices and streaming music player devices from communicating through the firewall device.

11. A firewall device comprising:
memory including processor executable instructions for controlling the firewall device, said firewall device being a router, said firewall device being in a network; and
a processor configured to execute the processor executable instructions stored in memory and control the firewall device to:
pass network traffic corresponding to at least a first device without applying firewall rules to the traffic corresponding to the first device as part of the first device communicating over a network with at least one device outside a first customer premises;
monitor, at the firewall device, network traffic through the firewall device corresponding to the first device communicating over the network with at least one device outside the first customer premises without subjecting said traffic corresponding to the first device to rules in a firewall template for a period of time;
analyze, prior to applying firewall rules at the firewall device to traffic corresponding to the first device communicating over the network with at least one device outside the first customer premises, the network traffic corresponding to the first device passing through the firewall device, to identify a device type of the first device, said analyzing identifying the first device as a first type device; and
apply, at the firewall device, a first rule in a firewall template applicable to devices of the first type, said applying the first rule including applying the first rule to traffic corresponding to the first device when the first device attempts to send or receive traffic via the firewall device, said applying of the first rule following identifying the first device as a device of the first type based on traffic passed through the firewall device.

12. The firewall device of claim 11, wherein said processor is further configured to:
store a set of firewall templates, said set of firewall templates including at least a first firewall template including at least one firewall rule to be applied to devices of a first type, said devices of a first type being one of a video player device type, video camera device type, a voice assistant device type, a gaming console device type or a cell phone device type; and
determine the firewall template that is applicable at a given time from the stored set of firewall templates based on one or more of: i) a current day of the week, ii) a time of day, iii) a date, or iv) user input,
said storing a set of firewall templates and said determining the firewall template that is applicable at a given time, being performed prior to applying the rules in the firewall template applicable at the given time.

13. The firewall device of claim 12, wherein at least some of said stored firewall templates include user specified restrictions to be applied by the firewall to devices of the first type.

14. The firewall device of claim 11, wherein said processor is further configured to:
identify devices located at said first customer premises where said firewall device is located based on at least one of a source address and a destination address included in detected network traffic.

15. The firewall device of claim 11, wherein said processor is further configured to:
use a neural network trained to identify device types based on monitored traffic to determine a device type corresponding to an identified device.

16. The firewall device of claim 12 wherein the firewall device is a router.

17. A system comprising:
a firewall device located at a first customer premises and operating as a router, said firewall device being in a network, the firewall device including:
memory including processor executable instructions for controlling the firewall device; and
a first processor configured, under control of the processor executable instructions, to control the firewall device to:
pass network traffic corresponding to at least a first device without applying firewall rules to the traffic corresponding to the first device as part of the first device communicating over a network with at least one device outside the first customer premises;

monitor, at the firewall device, network traffic through the firewall device corresponding to the first device communicating over the network with at least one device outside the first customer premises without subjecting said traffic corresponding to the first device to rules in a firewall template for a period of time;

analyze, prior to applying firewall rules at the firewall device to traffic corresponding to the first device communicating over the network with at least one device outside the first customer premises, the network traffic corresponding to the first device passing through the firewall device, to determine a device type of the first device, said analyzing identifying the first device as a first type device; and apply, at the firewall device, a first rule in a firewall template applicable to devices of the first type, said applying the first rule including applying the first rule to traffic corresponding to the first device when the first device attempts to send or receive traffic via the firewall device, said applying of the first rule following identifying the first device as a device of the first type based on traffic passed through the firewall device.

18. The system of claim 17, wherein said first processor is further configured to:

store a set of firewall templates, said set of firewall templates including at least a first firewall template including at least one firewall rule to be applied to devices of the first type, said devices of a first type being one of a video player device type, video camera device type, a voice assistant device type, a gaming console device type or a cell phone device type.

19. The system of claim 18, wherein said first processor is further configured to:

determine the firewall template that is applicable at a given time from the stored set of firewall templates based on one or more of: i) a current day of the week, ii) a time of day, iii) a date, or iv) user input.

20. The system of claim 18, wherein the firewall device is a router.

* * * * *